United States Patent [19]

Morgenstern

[11] Patent Number: 5,802,508
[45] Date of Patent: *Sep. 1, 1998

[54] REASONING WITH RULES IN A MULTIPLE INHERITANCE SEMANTIC NETWORK WITH EXCEPTIONS

[75] Inventor: Leora Morgenstern, New York, N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 700,973

[22] Filed: Aug. 21, 1996

[51] Int. Cl.$^6$ ................................................ G06F 17/00
[52] U.S. Cl. ................................................ 706/55; 706/48
[58] Field of Search ........................ 395/63, 64; 706/55, 706/48

[56] References Cited

PUBLICATIONS

J. McCarthy, 1980, "Circumscription—A Form of Non–Monotonic Reasoning," Artificial Intelligence 13, 27–39, North–Holland Publishing Co. 1980.

R. Reiter, 1980: "A Logic for Default Reasoning," Artificial Intelligence 25, 86–132.

R. Moore, 1985: "Semantical Considerations on Nonmonotonic Logic," Artificial Intelligence 25, 75–94.

J. McCarthy, 1986: "Applications of Circumscription to Formalizing Common–send Knowledge," Artificial Intelligence 28, 86–116.

L. Stein, 1992: "Resolving Ambiguity in Nonmonotonic Inheritance Hierarchies," Artificial Intelligence, 55, 259–310.

J. Horty, 1994: "Some Direct Theories of Nonmonotonic Inheritance" in D. Gabbay, C. Hogger, and J. Robinson, eds: Handbook of logic in Artificial Intelligence and Logic Programming, vol. 3: Nonmonotonic Reasoning and Uncertain Reasoning, Oxford Univefsity Press, Oxford, pp. 111–187.

M. Genesereth and N. Nilsson (1987), Logical Foundations of Artificial Intelligence, Morgan Kaufmann, Los Altos, California, 13–21 & 63–92.

A. Barr and E. Feigenbaum, 1981: Handbook of Artificial Intelligence, vol. 1, Heuristech Press, 190–199, 1981.

Horty, "A skeptical theory of inheritance in nonmonotonic semantic networks," Artificial Intelligence, 42, 311–349, Dec. 1990.

Keene, "Object–oriented programming in common lisp," chapter 6, Dec. 1990.

*Primary Examiner*—Allen R. MacDonald
*Assistant Examiner*—Jeffrey S. Smith
*Attorney, Agent, or Firm*—Louis J. Percello

[57] ABSTRACT

A new data structure describes an inheritance network with exceptions, augmented with rules attached to nodes in the network, a background context of rules and information, and an optional prioritization of links in the network. A process that determines which rules apply to classes (nodes) in the taxonomy exploits the structure of the network, in particular specificity and path prioritization, to get preferred maximally consistent subsets of rules that apply at specified nodes.

37 Claims, 31 Drawing Sheets

620,
BACKGROUND
CONTEXT B
{b,(d v e)=>f}

THERE ARE 9 MAXIMALLY CONSISTENT SUBSETS:

1021: p=>q  
~q  
rvs  
~s

1022: p  
~q  
rvs  
~s

1023: p=>q  
p  
rvs  
~s

1024: p=>q  
~q  
rvs  
~r

1025: p  
~q  
rvs  
~r

1026: p=>q  
p  
rvs  
~r

1027: p=>q  
~q  
~r  
~s

1028: p  
~q  
~r  
~s

1029: p=>q  
p  
~r  
~s

620,
BACKGROUND
CONTEXT B
{b,(d v e)=>f}

ONLY 1 MAXIMALLY CONSISTENT SUBSET IS A
<u>PREFERRED</u> MAXIMALLY CONSISTENT SUBSET

1021: p=>q
~q
rvs
~s

1022: p
~q
rvs
~s

1023: p=>q
p
rvs
~s

1024: p=>q
~q
rvs
~r

1025: p
~q
rvs
~r

1026: p=>q
p
rvs
~r

1027: p=>q
~q
~r
~s

1028: p
~q
~r
~s

1029: p=>q
p
~r
~s

620,
BACKGROUND
CONTEXT B
{b,(d v e)=>f}

STAGE 1: APPLY (500) = { }
STAGE 2: APPLY (501) = {p=>q,rvs}
STAGE 3: APPLY (503) = {p,p=>q,rvs}
STAGE 4-GET {p,p=>q,rvs,~q,~s} — INCONSISTENT!!

MOST PREFER ~q TO p OR p=>q --- BUT
THE INFORMATION THAT p IS PREFERED TO p=>q IS LOST.

620,
BACKGROUND
CONTEXT B
{b,(d v e)=>f}

STAGE 1: APPLY (505)= {~q,~s}  [1121]
STAGE 2: (GO UP TO 503) APPLY (505) = {~q,~s,p}  [1122]
STAGE 3: (GO UP TO 501) APPLY (505) =PMCS(~q,~s,p,p=>q,rvs)
    {~q,~s,p,rvs}  [1123]
STAGE 4: (GO UP TO 500) APPLY (505) = {~q,~s,~p,rvs}  [1124]
STAGE 5: (GO UP TO 502) APPLY (505) = {~q,~s,~p,rvs)  [1125]

FINAL

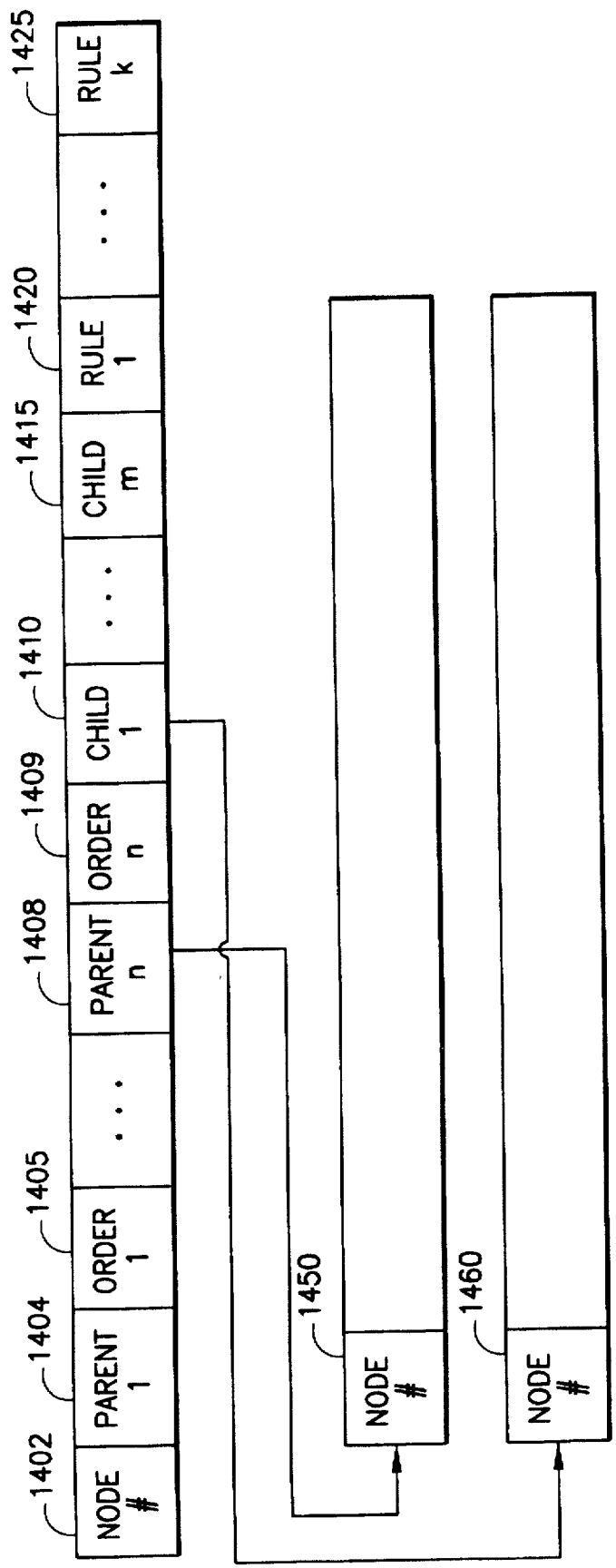
FIG. 14  THE INHERITANCE NETWORK IN MEMORY
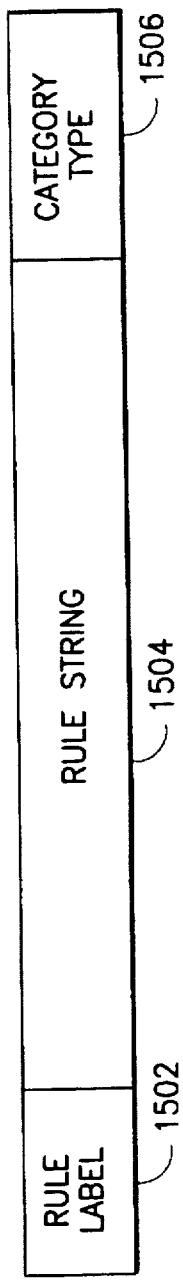
FIG. 15  RULE IN MEMORY STAGES IN COMPUTING RULES THAT APPLY TO NODE 505:
(TRAVERSING UPWARD, PREFERRED PATH FIRST)

STAGE 1: APPLY (505): t2:{w}

STAGE 2: UP TO 503: t1:{~q} t2{w}

STAGE 3: UP TO 501: t1:[p,~q} t2{w,z=>j} t3:{c}

STAGE 4: UP TO 500: t1-PMCS({p,~q,p=>q}) = {p,~q}
t2:{w,z=>j,w=>z} t3 {c}

STAGE 5: UP TO 502 t1-PMCS({p,~q},{p=>q}) = {p,~q}
t2-PMCS({w,z=>j,w=>z},{~j}) = {w,z=>j,w=>z}
FINAL t3:{c}

FOCUS ON NODE 505

APPLY TO NODE 505 — t1:{~q,p=>q}  [SINCE 505-502 PREFERRED
                                                        TO 505-503 FOR t1]

t2:{w,z=>j,w=>z}  [SINCE 505-503 PREFERRED
                                            TO 505-502 FOR t2]

t3:{c}

REASONING WITH RULES IN A MULTIPLE INHERITANCE SEMANTIC NETWORK WITH EXCEPTIONS

FIELD OF THE INVENTION

This invention relates to the field of artificial intelligence. More specifically, the invention relates to an artificial intelligence semantic network with exceptions and multiple inheritance.

BACKGROUND OF THE INVENTION

A semantic network is a structure for representing information about a particular domain. Semantic networks can encode information about a business, a field of medicine, or simple commonsense knowledge. Semantic networks are typically used to encode knowledge about objects and the relation between those objects. For example, a semantic network would be useful for representing the information about classes of drugs and various properties such as indications, contraindications, side effects, and prices.

The basic building blocks of a semantic network are nodes and links. A node typically represents an object or a set of objects. For example, a node in a semantic network giving information about prescription drugs could represent the class of all analgesics. Sometimes, the object a node represents is best thought of as a more abstract concept. For example, in the drug example, a node may represent the price (or set of prices) of a particular drug, such as $20 (or all prices less than $20). We often refer to such abstract concepts, which may also be viewed as properties, as attributes.

A link relates two nodes. (A link can theoretically connect more than two nodes; if it does, it is known as a hyperlink in a hypernetwork; we do not deal with hyperlinks here.) A link may represent any binary relation. For example, in the example above, one could specify a link representing an "indications" relation between a node representing the drug ibuprofen and a node representing the set of symptoms fever, pain, swelling.

Of particular interest are two links usually referred to as isa and inst. The isa link connects nodes A and B if the class (set) of objects that A represents is a subset of the set of objects that B represents. For example, if node A represents the set of all non-steroidal anti-inflammatory drugs and node B represents the set of all fever-reducing drugs, then A isa B (all non-steroidal anti-inflammatory drugs reduce fever to some extent). The inst link connects nodes A and B if the object that A represents is a member of the set of objects that B represents. For example if A represents the object Queen Elizabeth and B represents the set of all monarchs of Great Britain, then A inst B (commonly read as "A is an instance of B"). In standard set theory, isa is also known as the subset relation, $\subseteq$ and inst is known as the member relation $\in$.

The isa and inst links are generally used to describe taxonomic hierarchies. The canonical examples of taxonomic hierarchies are the plant and animal kingdoms, but there are many other examples in everyday life and in business applications. The drug domain, for example, can easily be viewed as a taxonomic hierarchy; e.g., different brands of ibuprofen form a subclass of non-steroidal anti-inflammatory drugs which form a subclass of analgesics. It will be noted that most taxonomic hierarchies allow for classes to have multiple superclasses. For example, NSAIDS have both analgesics and fever-reducing drugs (antipyretics) as superclasses. (Some purists prefer to use the word hierarchy to refer only to structures that do not allow multiple superclasses; however, this disclosure will follow standard usage and allow the terms hierarchy and taxonomy to refer to structures that allow multiple superclasses.)

As noted before, nodes may be thought of as representing attributes. Suppose node A represents the class of all elephants and that node B represents the class of all large things. An isa link from node A to node B indicates that the class of all elephants is a subclass of the class of all large things. In a natural language (such as English) this is more naturally expressed as the statement that all elephants are large. That is, elephants have the attribute of being large.

Inheritance Hierarchies

One defines a simple inheritance hierarchy to be a semantic network with the following characteristic: all links are either inst or isa links.

Inheritance hierarchies form taxononies; that is, arrangements of groups based on subtype, supertype, and classification according to common features.

If one considers an inheritance hierarchy as a directed acyclic graph (DAG), then in most inheritance hierarchies, if there is an inst link between A and B, A is a leaf of the DAG.

A is a parent of B if there is an inst, isa or d-isa link from B to A.

Ancestor is defined recursively as follows:

A is an ancestor of B if A is a parent of B;

A is an ancestor of B if there is some node C such that A is an ancestor of C and C is a parent of B.

A is a root node if A has no ancestors.

One can say that A->B if there is an inst or isa link between A and B. The notion of a path in the inheritance hierarchy can now be elaborated. There is a path between A and B (written A--->B) if one of the following conditions holds:

(i) A->B (there is an inst or isa link between A and B)

(ii) There is some node X such that A--->X and X->B (there is a path between A and X and X isa B)

The question of interest in an inheritance hierarchy is: Is there a path between two nodes X and Y? This is equivalent to asking if X is a subclass of Y (or if X is an element of Y, if the first link in the path is an inst rather than an isa link). As explained above, this typically translates into asking if the members of X have some property Y. For example, consider nodes A, B, and C, where A isa B and B isa C. Let A represent the class of all ibuprofen medications; let B represent the class of all NSAIDs; and let C represent the class of all analgesics (i.e., let C represent the property of being an analgesic). Then the question: is there a path between A and C translates directly into the question: is ibuprofen an analgesic? Determining whether there is a path between two nodes, and thus, determining whether a class has a certain property, is the main focus of queries in an inheritance network.

In many business and commonsense applications, a variant of the inheritance network, known as an inheritance hierarchy with exceptions (IHE) is very useful. Two types of inheritance hierarchies with exceptions have been discussed in the literature; classic IHE's, in which all links are considered to be defeasible (in the sense to be made precise, below), and hybrid IHE's, in which links may be defeasible or strict. Classic IHE's will be discussed in most of what follows below, with no loss of generality.

Inheritance hierarchies with exceptions

The central concept of an inheritance hierarchy with exceptions is that of the defeasible link. Two types of defeasible links are important: the defeasible isa link and the defeasible cancels link. Intuitively, there is a defeasible isa link between nodes A and B if the class of objects that A represents is "close-to" a subset of the set of objects that B represents. In other words, if x is a member of the class A, then it is typically the case that x is a member of the class B. For example, let A be the class of all birds and let B be the class of all creatures that can fly. Then A is close-to a subset of B; a bird can typically fly. A is not a genuine subset of B because there are birds that cannot fly; thus, it is not the case that every member of A is also a member of B. One therefore can say that there is a defeasible isa link between A and B. One can abbreviate this by saying A d-isa B, or A=>B. (Note: This link is called a defeasible isa link because the conclusion reached via the link; namely, that a particular bird flies is defeasible; that is, one may retract it.)

A defeasible cancels link between A and B means that members of the class A are typically not members of the class B. For example, if A represents the class of all penguins, and B represents the class of all flying objects, a defeasible cancels links can be specified between A and B. That is, penguins usually are not flying objects, since penguins typically do not fly. If there is a cancels link between A and B, one writes A d-nisa B or A!=>B.

FIG. 1 depicts an inheritance hierarchy with exceptions. The inheritance hierarchy depicted is known as the penguin triangle. The single arrow represents a d-isa (defeasible isa) link; the double arrow represents an isa link; the slashed arrow (whether curved or straight) represents a cancels link. Each node represents a set of objects, which are indicated by the label of the node. Thus, this inheritance hierarchy contains the information that all penguins are birds; that birds are typically flying objects (that is, birds typically fly); and that penguins typically are not flying objects. There are conflicting paths in this hierarchy; that is, there is both a positive and a negative path between penguin and flying object. The question is thus which conclusion to draw—that penguins are flying objects or that penguins are not flying objects. The answer is that one concludes that penguins are not flying objects. This is because the cancels link between penguins and flying objects is more specific than the link between bird and flying object. Thus, the negative path between penguin and flying object is preferred to the positive path between penguin and flying objects, and one concludes that penguins typically do not fly This method for drawing conclusions from an inheritance hierarchy with exceptions was formalized by Horty et al. (1990).

Importance of cancels links in IHEs

Cancels links are important in IHEs because they allow the specification of exceptions. Standard inheritance hierarchies do not allow exceptions. If predatory birds are a subclass of birds, and vultures are a subclass of predatory birds, then it is clear that vultures are a subclass of birds. But consider what happens in the penguin-bird example, above. All penguins are a subclass of birds, but there is a defeasible isa link rather than an isa link between birds and the class of flying objects. And indeed, one cannot say that penguins are a subclass of flying objects. On the contrary, penguins typically do not fly. See FIG. 1. By specifying an isa link between the node representing the class penguins and the node representing the class of birds, a d-isa link between the node representing the class of birds and the node representing the class of flying objects, and a cancels link, d-nisa, between the node representing the class of penguins and the class of flying objects, one can say that birds typically fly, but that there are exceptions, such as penguins.

The concept of path, first discussed in the context of general inheritance hierarchies, can be extended to inheritance hierarchies with exceptions. Paths are defined recursively in the following manner. See Horty (1994): "Some Direct Theories of Nonmonotonic Inheritance" in D. Gabbay, C. Hogger, and J. Robinson, eds: *Handbook of Logic in Artificial Intelligence and Logic Programming*, Vol. 3: *Nonmonotonic Reasoning and Uncertain Reasoning*, Oxford University Press, Oxford, pages 111-187 which is herein incorporated by reference in its entirety.

There is a path from A to B if and only if there is a positive path from A to B or a negative path from A to B.

If A->B or A=>B, then there is a positive path from A to B.

If A!->B or A!=>B, then there is a negative path from A to B.

If there is a positive path from A to B, and B->C or B=>C, then there is a positive path from A to C.

If there is a positive path from A to B, and B!->C or B!=>C, then there is a negative path from A to C.

If there is a negative path from B to C and A->B or A=>B, then there is a negative path from A to C.

Note that positive paths can have only positive is-a links; negative paths can have just one negative link at the very end of the path.

One question for inheritance hierarchies with exceptions, as for standard inheritance hierarchies, is Determining whether there is a positive or a negative path between two nodes. But answering this question is not sufficient. Consider, for example, FIG. 1, known as the penguin triangle, which represents the penguin-bird example described above. There is both a positive path between penguin and flying-object (penguin->bird=>flying object) and a negative path between penguin and flying-object (penguin!->flying object). The intuition, which will be formalized below, is that the negative path wins.

On the other hand, consider FIG. 2 (Nixon diamond).

FIG. 2 depicts a special case of an inheritance hierarchy with conflicting paths known as the Nixon diamond. The network represents the information that Nixon is a Quaker; that Nixon is a Republican; that Quakers are typically pacifists; and that Republicans are typically not pacifists. There is a positive path between Nixon and pacifist, indicating that Nixon is a pacifist, and a negative path between Nixon and pacifist, indicating that Nixon is not a pacifist. These conclusions are obviously contradictory; the question is which conclusion to draw. In this case, neither the positive nor negative path is more specific than the other; thus, one cannot draw a conclusion as to Nixon's pacifism. This is a desired feature of inheritance hierarchies with exceptions. Since Nixon is a Quaker, there is a path between Nixon and pacifist; since Nixon is a Republican, there is a path between Nixon and non-pacifist. Intuitively, neither path should win over its rival; one should be able to conclude nothing about Nixon's pacifism given just the information in FIG. 2. (The fact that we know that Nixon was not a pacifist is due to external information and is not relevant to this example.)

Thus, the question of interest for inheritance hierarchies is first, determining whether there is a positive or a negative path between two nodes and second, determining which path (if any) wins if there is both a positive and a negative path between two nodes.

This problem has been studied by, among others, in the following references: D. Touretzky, 1986: *The Mathematics of Inheritance Systems* Morgan Kaufmann, Los Altos, Calif. J. Horty, R. Thomason, D. Touretzky, 1990: "A Skeptical Theory of Inheritance in Nonmonotonic Semantic Networks," *Artificial Intelligence*, 42, 311-349

L. Stein, 1992: "Resolving Ambiguity in Nonmonotonic Inheritance Hierarchies," *Artificial Intelligence*, 55, 259–310. These references are herein incorporated by reference in their entirety.

Conflicting paths are now defined. Two paths P1 and P2 are said to conflict, if:

1. The start points of P1 and P2 are the same and the end points of P1 and P2 are the same.
2. One of P1 and P2 is positive; the other path is negative.

Conflicting paths are always explicitly contradictory. That is, a positive path between nodes A and B means that A has the property of B; a negative path between nodes A and B means that A has the property of not B. One cannot have the property of B and not B at the same time, since B and not B are inconsistent. This inconsistency is explicit.

Choosing among conflicted paths has been addressed by the prior art. One suggested criterion (Touretzky, 1986 has sources) was to prefer the shortest path between two nodes. That is, if there is both a positive and a negative path between nodes A and B, and the positive (resp. negative) path is shorter than the negative (resp. positive) path, then the positive (resp. negative) path wins; i.e., can conclude that A's are typically B's (resp. A's are typically not B's). It is clear that this criterion will work for examples such as the penguin-triangle since the negative path between penguin and flying object is shorter (length 1) than the positive path between penguin and flying object (length 2). This strategy is known as the shortest-path strategy.

The shortest-path strategy, however, does not work for a wide variety of cases. See, for example, FIG. 3, the Clyde-royal-elephant network, that illustrates why specificity is a better criterion for choosing among conflicting paths than is shortest distance. The hierarchy represents the following information: Clyde is a royal elephant; royal elephants are elephants; elephants are typically gray; royal elephants are not gray. There is also an extra, or redundant, link in the network, representing the information that Clyde is an elephant. (The link is redundant, because one could have deduced the fact that Clyde is an elephant from the facts that Clyde is a royal elephant and that royal elephants are elephants.) This redundant link means that the shortest path strategy will not be sufficient to conclude that Clyde is not gray. The method of Horty et al. (1990), which uses the criterion of specificity, will, however, allow the desired conclusion.

In FIG. 3, the redundant link between Clyde and elephant gives two paths of equal length: 1. Clyde is a royal elephant and elephants are typically gray and 2. Royal elephants are typically not gray. This strategy does not let one conclude that Clyde is white, which is the intuitively correct answer. Similarly, consider FIG. 2 (augmented Nixon diamond), where the path between Nixon and pacifist is shorter than the path between Nixon and non-pacifist, even though intuitively, as discussed above, one should not be able to arrive at any conclusion about Nixon's pacifism.

Therefore, another strategy for determining which of two conflicting paths is preferred is used: that of specificity. This strategy was first suggested by (Touretzky, 1986), (Horty et al., 1990). The intuition is that if there are two conflicting paths to a node, the preferred path is the one that gives information about the more specific node. For example, consider again FIG. 1, the penguin triangle. The negative path from penguin to flying object is preferred over the positive path because the information that penguins are not flying objects is more specific than the information that birds are flying objects. On the other hand, neither Quaker nor Republican is more specific than the other. Thus, there is no reason to prefer the positive path from Nixon to pacifist over the negative path from Nixon to pacifist.

This strategy is known as the specificity strategy. It can be summarized as follows: A path from node A to node B is preferred in a context (roughly speaking, an inheritance hierarchy) if:

1) The path from A to B is constructible—that is, one can find such a path in the network, and
2) The path from A to B is neither conflicted nor pre-empted.

(An example of a conflicted path is the positive (resp. negative) path between Nixon and pacifist, since there is a negative (resp. positive) path between Nixon and pacifist that is neither more nor less specific than the first. An example of a preempted path is the positive path between penguin and flying object which is preempted by the more specific negative path between penguin and flying object.

Efficient algorithms have been provided to determine preferred paths. See Horty et al., 1990; Stein, 1992.

A node A is defined as a prime ancestor of B if there is a positive undefeated path between B and A and there does not exist a node C such that C is a parent of A and there is a positive undefeated path between B and C.

Multiple extensions

If there is both a positive and a negative path between nodes A and B, and neither path preempts the other, one says that the inheritance hierarchy supports multiple extensions. The intuition is that the network supports two ways of looking at the world—e.g., in the Nixon diamond, above, the network offers support for the view that Nixon is a pacifist and support for the view that Nixon is not a pacifist. Both views cannot be held simultaneously, since they are inconsistent; thus, generally, no conclusion is drawn. In the prior art, refraining from drawing conclusions in such a case is referred to as skeptical inheritance.

Some the prior art has attached rules to inheritance hierarchies without exceptions. See below.

Rules

Rules are in important construct of artificial intelligence applications (since so much of human interaction, including business, is done in accordance with rules). Formally, a rule is defined to be a logical formula. That is, it is a well-formed formula of first-order logic as defined in B. Mates (1972): *Elementary Logic* Second Edition, Oxford University Press M. Genesereth and N. Nilsson (1987), *Logical Foundations of Artificial Intelligence*, Morgan Kaufmann, Los Altos, Calif.

These references are herein incorporated by reference in their entirety. The most common type of rule encountered in artificial intelligence is the if-then rule, e.g.: "if the patient does not get approval from an insurance representative before visiting a non-network doctor, he will not get reimbursed at the highest level" or "if a patient spends $x on a doctor's visit, he will be reimbursed 80% of x", are examples of if-then rules.

If-then rules in classical first-order logic are universal rules. That is, they are rules that apply without exception. If one states in first-order logic that if a patient spends $x on a doctor's visit, he will be reimbursed 80% of x, that means that all patients are reimbursed 80% of all doctor's visits. No exceptions are allowed. If one wants to specify an exception, one must do so explicitly. For example, if preventive care is an exception to the 80% rule, one would have to give 2 rules:

1) if a patient spends $x on a doctor's visit and that visit is not a preventive-care visit then he will be reimbursed 80% of x and 2) if a patient spends $x on a doctor's visit and that visit is a preventive-care visit, then he will be reimbursed all of the cost except for $10.

In general, there may be many exceptions. In order to express and reason with these exceptions within first-order logic, one would have to explicitly mention and have rules about all exceptions.

In many real-world and business applications—the applications that are the goal of AI—one does not wish to explicitly specify all exceptions. It is too time-consuming, at best, and may be impossible because we may not know all exceptions. Rather, the desire is to express a rule such as Usually, patients are reimbursed 80% of the cost of a doctor's visit and then to separately specify any known exceptions.

This cannot be done within first-order logic. However, there are logics which have been specifically designed to express and reason with concepts such as usually and most. These logics are called nonmonotonic logics. Nonmontonic logics allow one to express facts such as Typically, preventive care is covered or Most maternity patients are discharged within 48 hours after delivery. Various nonmonotonic logics have been suggested, including Default Logic, Circumscription, and Autoepistemic Logic, which are described in the following references:

Default Logic (Reiter, 1980), R. Reiter, 1980: "A Logic for Default Reasoning," *Artificial Intelligence*, vol. 13;

J. McCarthy, 1980: "Circumscription—A Form of Non-Monotonic Reasoning," *Artificial Intelligence* 13, 27–39;

J. McCarthy, 1986: "Applications of Circumscription to Formalizing Commonsense Knowledge," *Artificial Intelligence* 28, 86–116; and R. Moore, 1985: "Semantical Considerations on Nonmonotonic Logic," *Artificial Intelligence* 25, 75–94.

These references are incorporated by reference in their entirety.

There are several basic issues that any nonmonotonic formalism addresses:

drawing inferences: given that patients typically get reimbursed 80% for doctor visits and that patient x paid $100 for his visit to Dr. y, infer that x was reimbursed $80.

retracting incorrect conclusions: if one later finds out that patient x's visit to Doctor y fell under the category of preventive care, retract the conclusion that x was reimbursed $80; infer that he was reimbursed $90.

dealing with conflicting rules: if one rule states that diagnostic procedures are usually paid at 90% and another rule states that surgical procedures are usually paid at 80%, how is diagnostic surgery reimbursed? Two default rules conflict here. (Note that this is similar to the issue of multiple extensions, discussed above.) Sometimes, one will have a particular criterion such as specificity that one wishes to be enforced (Brewka, 1989; Geffner, 1991).

belief revision: if someone believes a certain set of facts, but later finds out information that is contradictory, how can that person revise his beliefs so that he takes into account the new information, but so that his resulting beliefs are still consistent? (Gardenfors and Makinson, 1988)

An implemented system of nonmonotonic logic must be able to determine if a set of sentences is consistent or inconsistent. It must also be able to draw the first-order consequences of a set of sentences. The second of these issues has been well-understood since the 1960's (Genesereth and Nilsson, 1987; Wos et al., 1992); there exist procedures to draw inferences in first-order logic. The second problem—determining whether a set of sentences is consistent or inconsistent—is somewhat trickier. Specifically, it is well-known that this problem is only semi-decidable; that is, there exists a procedure which, given a set of sentences, will terminate with the answer "inconsistent" if the set of sentences is inconsistent, but which may never terminate if the set of sentences is consistent. Thus, if a program using this procedure is running on a set of sentences, there is no way of knowing if the set of sentences is inconsistent but the program hasn't yet terminated, or if the set of sentences is consistent and the program will never terminate. In practice, this problem is handled in several ways:

First, there are procedures which will terminate with a "consistent" or "inconsistent" answer for restricted classes of sentences, namely those equivalent to formulas of propositional logic. The issue then is one of producing a set of formulas of propositional logic equivalent to the original set of rules. There are various cases in which this can be done.

Second, since the worst case of non-termination does not happen very often, it is reasonable to provide a generous upper bound of time to the procedure to determine inconsistency; if the procedure does not terminate, assume consistency. This method will give incorrect results some time, but will work for the vast majority of cases.

Even for the propositional case in which the procedure to determine inconsistency is guaranteed to terminate, the time involved, relative to the size of the problem, is considerable. Specifically, determining the consistency of a set of propositional sentences is NP-complete. This means that the problem is in NP and is NP-hard. If a problem is in NP, that means that it is possible, if non-deterministic methods are allowed, to solve the problem in polynomial (efficient) time. Thus, in this case, this means that there is a non-deterministic way to determine the consistency of a set of sentences in poynomial (efficient) time. A problem is NP-hard if it is at least as hard as all other problems that are in NP. The problem of determining if a set of sentences is consistent is thus NP-hard. Since non-determinacy is just a theoretical construct—there do not exist non-deterministic machines, and since the only known way to mirror non-determinacy using standard computers is by providing a method that is exponential (that is, extremely time-consuming and inefficient), this means that it is very likely that determining whether a set of sentences is consistent is very time-consuming (These concepts are discussed in (Hopcroft and Ullman, 1979)).

Rules in Inheritance Hierarchies

It is natural to think of attaching a rule to a node in an inheritance hierarchy. For example, if one considers an inheritance hierarchy of pharmaceuticals, one might attach a rule such as All prescription drugs must be dispensed by a licensed pharmacist to the node representing Prescription Drugs.

Researchers have explored attaching rules to nodes in an inheritance hierarchy in the following restricted setting: they have considered attaching universal rules (in classical monotonic logic) to nodes in inheritance hierarchies without exceptions. Recall that in inheritance hierarchies without exceptions, the only question one might ask is whether there is a path between 2 nodes, a question that is trivial to answer. There is no issue of conflicting paths, choosing preferred paths, or anything of the sort. In the works exploring universal rules attached to inheritance hierarchies without exceptions, such as J. Mylopolous, A. Borgida et al.(1990), "Telos: Representing Knowledge About Information Systems," *ACM Transactions on Information Systems*, 8 (4), 325-362, a rule attached to a node A is treated as any attribute and in particular, is assumed to be attached to any node B that is on a path leading to A.

This reference is herein incorporated by reference in its entirety.

Inconsistencies in Production Systems and Rules Engines

The core of an expert system is often a production system or rules engine that churns through a set of rules which describes the desired behavior of the system. By processing the rules, the system effects the desired behavior. The rules are usually written in an if <condition> then <action> form. The processing of rules typically takes the form of a match-and-fire strategy. If the facts in the current knowledge base match the conditions of a rule, then the corresponding action is taken.

A potential problem for production systems and rules engines is that the set of rules that forms the input to these systems is often inconsistent. This inconsistency is often manifested by multiple rules with antecedents that are simultaneously satisfied, and corresponding actions that are incompatible. Solutions to this problem usually take the form of an "arbitration strategy"—that is, a strategy to choose between multiple rules whose conditions are satisfied. These strategies are typically somewhat arbitrary (for example, taking the first or most recently used rule when there are multiple matches) or limited (for example, choosing the antecedent which is most specific, in the sense of having more conjuncts in the antecedent.) Because these strategies are so limited, these production systems cannot be proven to give the correct answer (desired behavior) for general classes of problems.

These issues are discussed in more detail in

A. Barr and E. Feigenbaum, 1981: *Handbook of Artificial Intelligence*, Volume 1, Heuristech Press;and P. Winston, 1992: *Artificial Inteligence*, Addison Wesley, Reading, Mass.

These references are herein incorporated by reference in their entirety.

STATEMENT OF PROBLEMS WITH THE PRIOR ART

The prior art cannot determine, and in fact has not recognized, whether a set of rules applies to a particular class/node in a semantic network with exceptions (conflicting paths) and multiple (non-conflicting path) inheritance. Much of the prior art has not recognized that multiple inheritance can arise in two situations: 1. where there are conflicting paths, and 2. where there are distinct but non-conflicting paths. Also, the prior art does not recognize the implicit inconsistencies that can arise in semantic networks due to background information, and does not solve the problems arising from these inconsistencies.

Further, the prior art cannot express or reason with rules with exceptions in inheritance hierarchies.

The prior-art does not solve the problem of reasoning with rules in multiple non-conflicting path inheritance hierarchies where some links may be preferred to others.

The prior-art does not recognize that rules attached to nodes in inheritance hierarchies can be categorized by types, subject to crucial consistency constraints, which can significantly enhance the efficiency of process to recognize and resolve inconsistencies. Accordingly, the prior art (specifically non-monotonic reasoning) does not recognize or suggest methods to avoid the NP-hard problem as it relates to non-monotonic reasoning.

Prior art rules-conflict strategies in rules engines and/or production systems do not detect and resolve multiple matches of antecedents in rules in a consistent and correct manner.

OBJECTS OF THE INVENTION

An object of this invention is a system and method that determines which rules in a set of rules apply to a class in a semantic network (specifically an inheritance hierarchy) with exceptions (conflicting paths) and/or multiple non-conflicting paths.

An object of this invention is an improved system and method that constructs a maximally consistent subset of rules from an inconsistent set of rules.

An object of this invention is an improved system and method that constructs a maximally consistent subset of rules from an inconsistent set of rules according to the criteria of specificity, preferred links and paths, and/or preempting paths.

An object of this invention is an improved system and method that constructs a maximally consistent subset of rules from an inconsistent set of rules in iterated stages, traversing the paths in a hierarchy in a upwards fashion, starting with the most preferred paths first, and working down to the less preferred paths.

An object of this invention is an improved system and method that represents rules in a way to avoid the NP-hardness inherent in any method to determine maximally consistent subsets of rules from an inconsistent set of rules.

An object of this invention is an improved system and method that provides a consistent set of rules—i.e., a set of rules that are not in conflict—as input to a production system or rules engine.

An object of this invention is a system and method that determines which rules in a set of rules apply to a class in a semantic network with exceptions (conflicting path) and multiple non-conflicting paths, used in an insurance application.

SUMMARY OF THE INVENTION

The invention consists of a new data structure for representing rules with exceptions in a taxonomy, and a method to determine which rules apply to different classes in the taxonomy.

The new data structure is an inheritance network with exceptions, augmented with several new features:

a set of rules may be attached to each node.

a background context consisting of rules and other items of information may be attached to the network.

multiple non-conflicting links and paths may be prioritized.

the rules may be categorized by type.

The method to determine which rules apply to different classes in the taxonomy exploits the structure of the inheritance network in creating preferred maximally consistent subsets of rules. These are the rules that apply to the classes in question. In particular, specificity, path prioritization, and path preemption are considered when determining preferred maximally consistent subsets. The proper categorization of rules prevents this method from being computationally inefficient.

BRIEF DESCRIPTION OF THE DRAWINGS

The foregoing and other objects, aspects and advantages will be better understood from the following detailed description of preferred embodiments of the invention with reference to the drawings that are include the following:

FIG. 14 is a block diagram depicting how the inheritance network is represented in the computer's memory.

FIG. 15 is a block diagram depicting the representation of a rule string in the computer's memory.

FIG. 26 is a block diagram depicting the modified inheritance hierarchy, rules categorized by type and different link preferences for different rule types, and nodes, in memory.

DETAILED DESCRIPTION OF THE INVENTION

Figure 1:
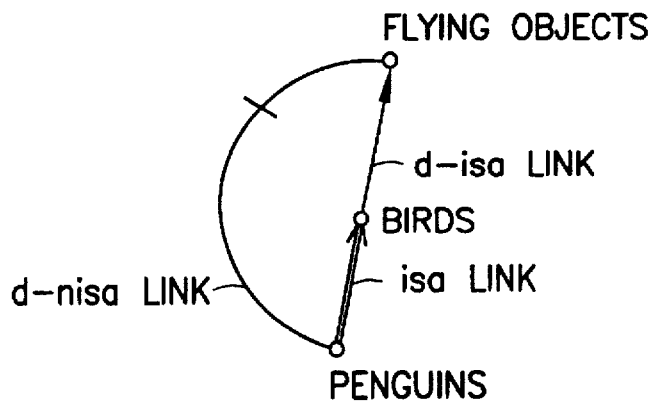
FIG. 1 is a prior art network diagram of the penguin triangle.
Figure 2:
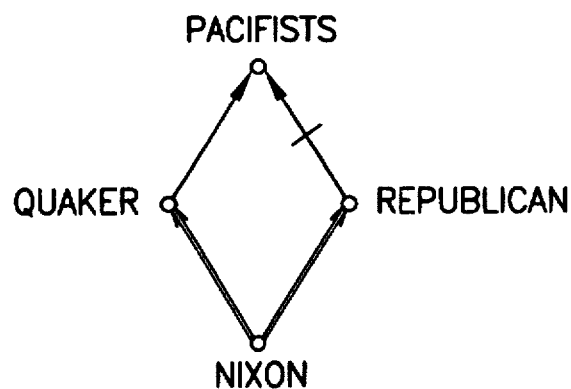
FIG. 2 is a prior art network diagram of the Nixon diamond.
Figure 3:
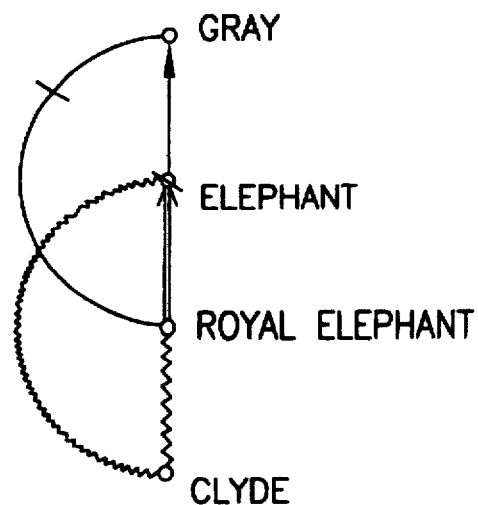
FIG. 3 is a prior art network diagram of the Clyde-royal elephant.
Figure 4:
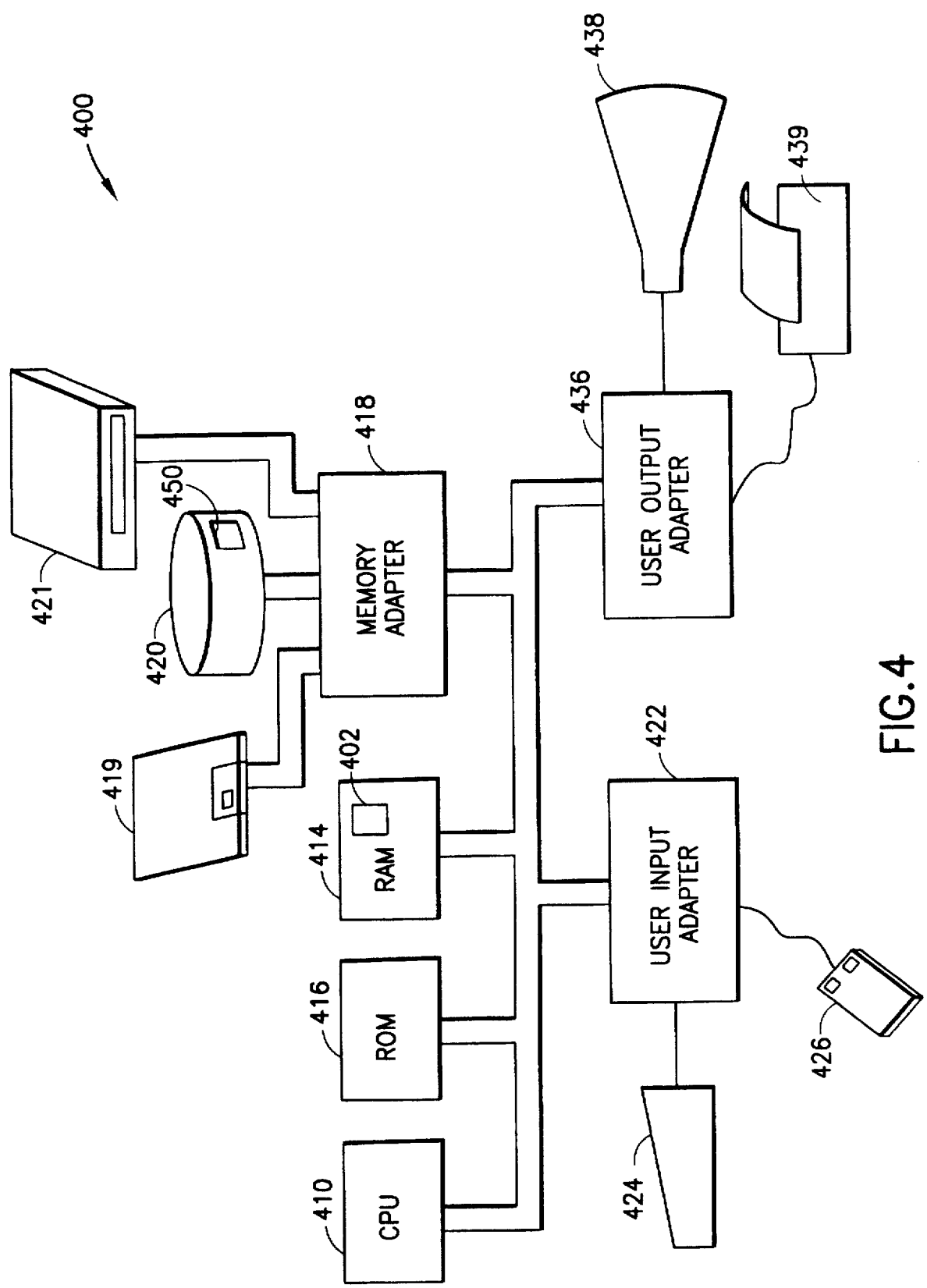
FIG. 4 is a block diagram of the present system.

Referring again to the drawings, and more particularly to FIG. 4, there is shown the block diagram representation of a general computer hardware environment 400. This computer 400 may be one of International Business Machines Corporation (IBM) Personal System/2 (PS/2) family of Personal Computers, a RISC System/6000, or Power Parallel System (SP/x). The system 400 includes one or more central processing units (CPU) 410, which may conform to Intel's x86 or other architecture or may be a reduced instruction set microprocessor. The CPU 410 is attached to a system bus 412 to which are attached a memory adapter 418, a (RAM) 414 that can include one or more cache memories, and a read only memory (ROM) 416. The RAM 414 provides temporary storage for one or more application program 402 containing code and/or data while the ROM 416 typically includes the basic input/output system (BIOS) code. Some of the application programs 402 are described as processes below. The memory adapter 418 can be connected to one or more Direct Access Storage Devices (DASDs), here represented as a floppy drive 419, a hard disk drive 420, and a CD-ROM 421. The hard disk drive 420 typically stores the computer's operating system (OS), such as IBM's OS/2 operating system, and various application programs, data, and/or databases 450, each of which can be selectively loaded into RAM 414 via the system bus 412. Typically, both the semantic network structure and the rules are in the database (450). The user input interface adapter 422 may have attached to it a keyboard 424, a mouse 426, and/or other user interface devices (not shown).

The system 400 also can include a display 438, here represented as a cathode ray tube (CRT) display but which may be a liquid crystal display (LCD) or other suitable display and/or graphic user interface (GUI). The display 438 is connected to the system bus 412 via a user output adapter 436 which may connect to other output devices, like a printer 439. These systems 400 and equivalents of these systems are well known to those skilled in the art.

Personal System/2, PS/2, OS/2, RISC System/6000, Power Parallel System, SP/x, and IBM are trademarks of the International Business Machines Corporation.

Figure 5:
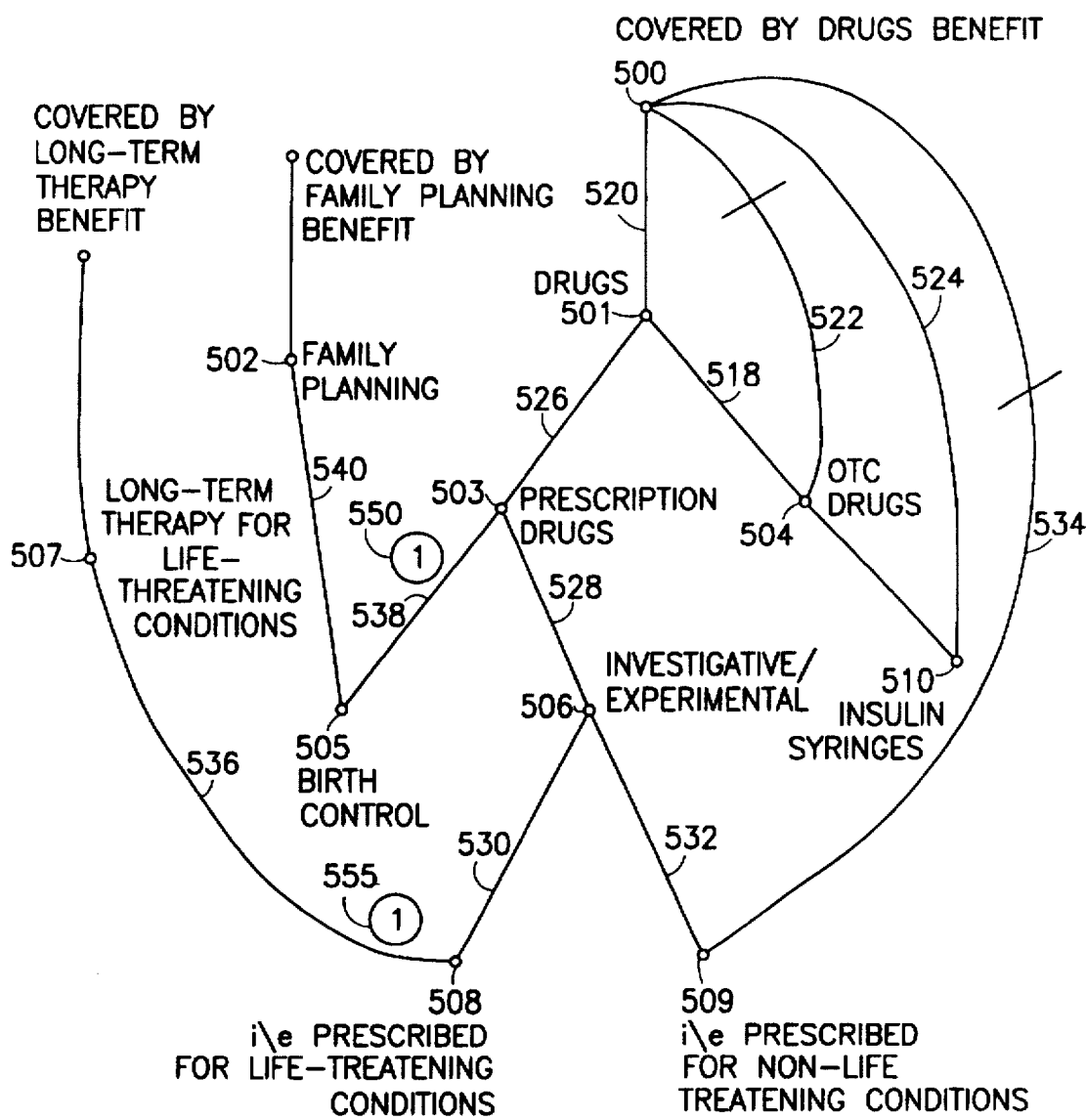
FIG. 5 is a network diagram of an inheritance hierarchy with exceptions with two features: separate path multiple inheritance and explicit link prioritization.

FIG. 5 depicts a novel form of inheritance hierarchy with exceptions. As a specific example, it represents a portion of the information about medical insurance services in an insurance company, focusing on drug services. The network depicts the way in which medical services are related to one another and to insurance benefits. The network represents the information that drugs are covered by the Drugs benefits, but that OTC drugs are not covered. This information is represented by the presence of an isa link (520) between the node Drugs (501) and the node Covered by Drugs Benefit (500), and a cancels link (522) between the OTC node (504) and the Covered by Drugs Benefit node (500). On the other hand, a specific type of OTC product, insulin syringes, is covered (see the isa link between the insulin syringes node (510) and the Covered by Drugs Benefit node). Prescription drugs (503) are typically covered, since they are a type of drugs; however, investigative/experimental drugs (506), a subclass of prescription drugs, are only covered sometimes. They are not covered if prescribed for non-life threatening conditions (509). They are covered if prescribed for life-threatening conditions (508) (hereafter called life-saving i/e drugs). Life-saving i/e drugs are also a subtype of long-term therapy services (507); there is an isa link (530) between life-saving i/e drugs and i/e drugs, as well as an isa link (536) between life-saving i/e drugs and long-term therapy services (507). Similarly, birth control (505), a subclass of prescription drugs, is also a subclass of family planing services (502).

Two features of this inheritance hierarchy will be explained further:

First, multiple inheritance (multiple paths can emanate from a single node; i.e., one can have paths x-->y and x-->z, where y is not equal to z) is not restricted to cases where the multiple paths are segments of conflicting paths. There are two types of multiple inheritance which are now defined: conflicting path multiple inheritance and separate path multiple inheritance or equivalently non-conflicting path multiple inheritance. Conflicting path multiple inheritance is the type of multiple inheritance found in traditional inheritance hierarchies with exceptions; multiple paths emanating from a single node that are segments of conflicting paths. Separate path multiple inheritance occurs when there are multiple paths emanating from a single node; however, these paths are not segments of conflicting paths.

In FIG. 5, there are examples of both types of multiple inheritance. Birth control (505) isa prescription service (503), and birth control isa family planning service (502). Thus, there are two paths (538, 540) emanating from a single node. Moreover, these paths do not conflict; thus, this is separate path multiple inheritance. OTC drugs (504) are drugs (501); drugs are typically covered by the Drugs benefit (500); OTC drugs are typically not covered by the Drugs benefit. Thus, there are two paths (518–520, 522) emanating from the OTC drugs node. These paths are conflicting; thus, this is traditional conflicting path multiple inheritance.

Second, this network allows for the prioritization of links in separate path multiple inheritance. For example, FIG. 5 indicates that the link (538) from birth control (505) to prescription drugs (503) has priority over the link (540) from birth control to family planning services (502). This priority is indicated by the circled numeral 1 over the link between birth control and prescription drugs (550). In general, the network allows for specifying a partial order over any k links emanating from a single node, as long as these represent separate path multiple inheritance. (In cases of conflicting-path multiple inheritance, one may not wish to allow prioritizing the links/paths.) This allows one to represent the information that certain attributes are more important than others, for a particular node in a network. The prioritization of links, also referred to as preferred links, is defined in the order field (1405,1409) in FIG. 14, below.

This is an improvement over the prior art, since previously, implicit conflicts in attributes in non-conflicting-path multiple inheritance were neither recognized nor resolved. Path prioritization allows resolution of such inconsistencies, as shown in FIG. 17.

Path prioritization (or path preference) is an extension of the concept of link prioritization; namely:

P(a,x,b) (the path from a to b through x) is preferred to P(c,x,b) (the path from c to b through x) if the link from a to x is preferred to the link from c to x. P(a,x,b) is preferred to P(a,x,c) if the link from x to b is preferred to the link from x to c.

Figure 6:
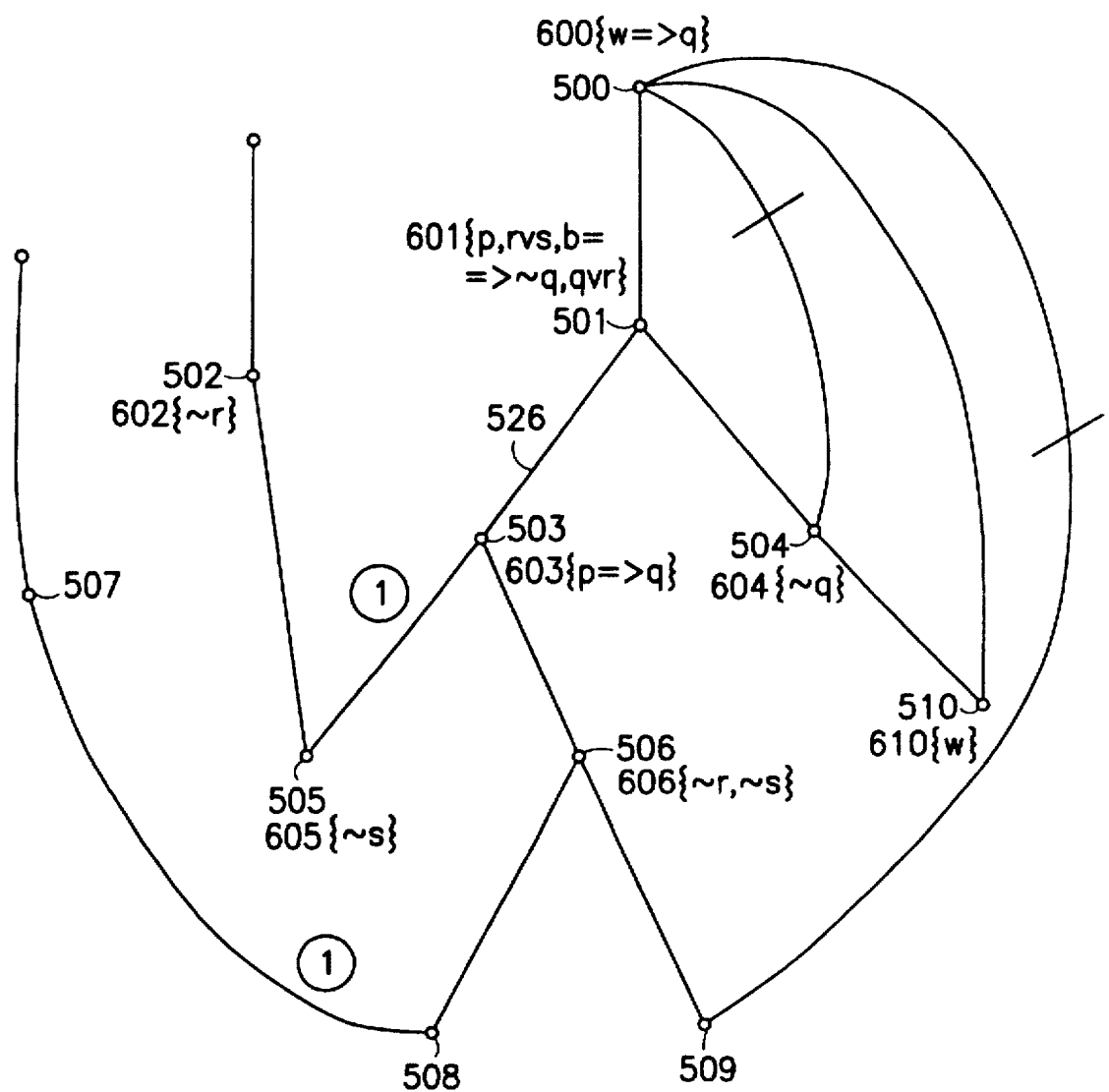
FIG. 6 is a network diagram of the inheritance hierarchy depicted in FIG. 5, with two additional features: the attachment of rules to the nodes in the inheritance hierarchy and the existence of a background context—a set of rules or tables—for the inheritance hierarchy that is consistent but incomplete.

FIG. 6 depicts the inheritance hierarchy with exceptions shown in FIG. 5, but with two additional novel features.

First, each node may have a set of rules attached to it. A rule attached to a node in this network will typically describe some feature of the service represented by the node. For example, there might be a rule Prescription drugs must be dispensed by a licensed pharmacist attached to the Prescription drugs node. To simplify the figures and text, formulas of propositional logic are used here instead of rules in English text. For example, FIG. 6 shows that the set of rules {~r} (602) is attached to node 502 (family planning); the set of rules {p, r v s, b ==>~q, q v r} (601) is attached to node 501 (drugs). (Note that the symbol v is used to designate the logical connective "or"; thus r v s is read "r or s".)

The set of rules at each node is constrained to be consistent. That is, it must be the case that they can all be true at the same time. This is obviously a desirable feature of this network, since the rules are meant to describe true statements about various medical services (or whatever the nodes in a particular network represent). The set of rules is also constrained to be consistent with the background context (see below).

Second, the network is augmented by a background context. In FIG. 6, the background context is labeled (620) and is the set {b, (d v e)==>f}. The background context (620) is some item or items of information. It may be a set of rules, or it may be a table of information, or both. For example, the background context may include the rules that determine eligibility of members of a health insurance group. The background context could also include a table giving name, address, and specialty of various medical personnel and a table giving pricing information for a comprehensive list of drugs. As these examples show, the background context is on the one hand general information, which should apply to all nodes in the network; but on the other hand, often represents transitory information, which may need to be updated frequently. Background information is general but need not be permanent. The background context is naturally constrained to be consistent.

Attaching rules to nodes and adding background information (602) is enabled as described in FIGS. 14 through 27.

Intuitively, the background context (602) represents the set of facts that are true for all nodes in the network. The rules that are attached to a node represent the rules that are true for a particular node.

The following question now arises: If there is a positive path between A and B, does node A inherit the rules of node B? More generally, what are the rules that apply to any node in the network? These are questions that have not been recognized or addressed by the prior art.

It seems clear that the set of rules that apply to a node ought to be a superset of the rules that are attached to the node. For example, in FIG. 6, there are no rules attached to node 508. This probably does not mean that there are no rules that are true at node 508. Rather, it seems reasonable that node 508 ought to inherit rules from node 506 and node 507 (as well as possibly nodes 503, 501, and 500, the ancestors of node 506). This question is considered in more detail in the discussion of the subsequent figures.

Figure 7:
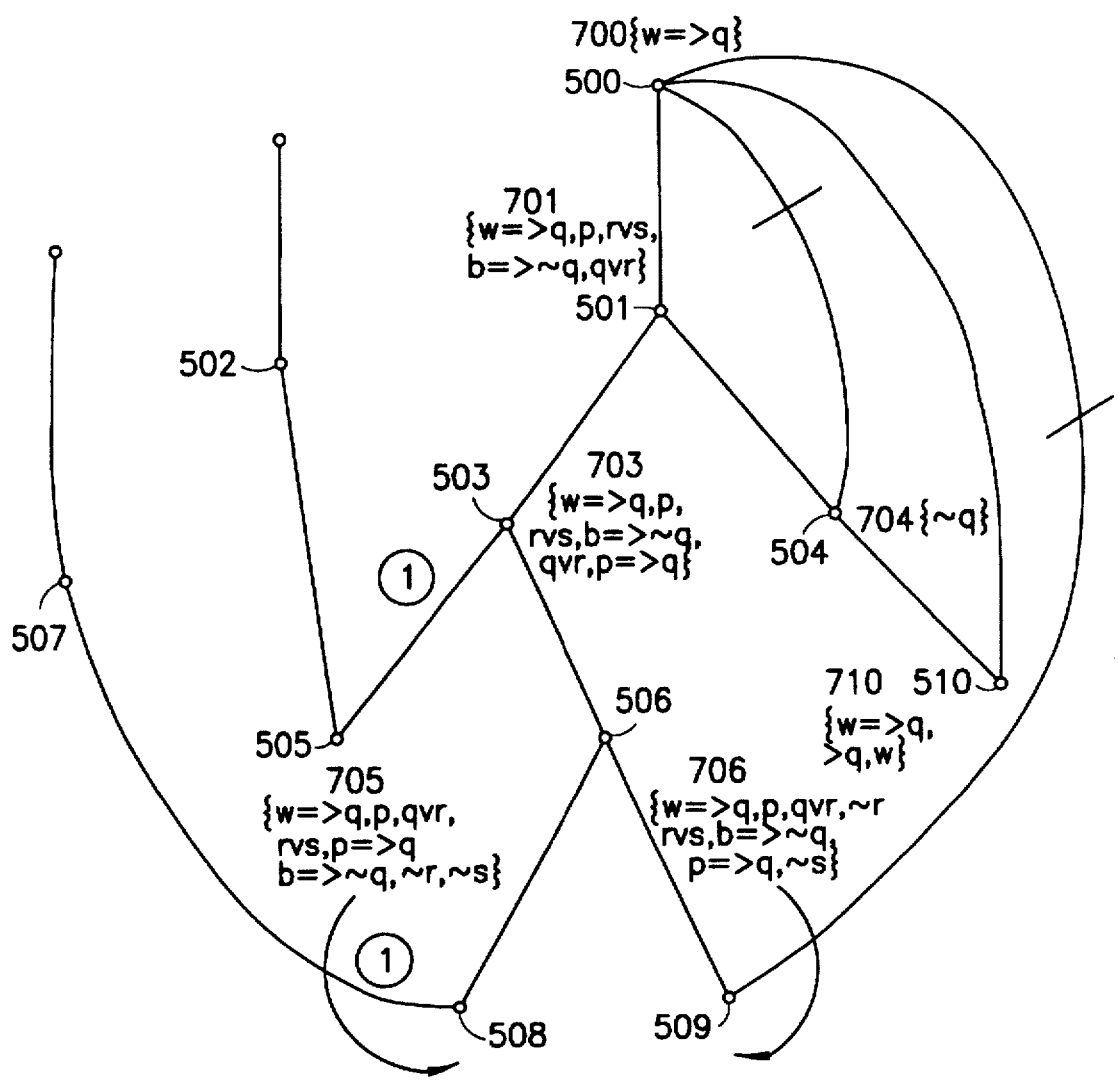
FIG. 7 is a network diagram showing how one method that determines the set of rules that apply to a node is flawed, because it leads to inconsistency.

FIG. 7 depicts a "strawman" solution to the problem of determining the set of rules that applies to a particular node, that is, a proposed solution that turns out to be flawed. The strawman solution suggests that the rules that apply to a node is the union of the rules at that node together with the rule sets that apply to the parent nodes. This means that one takes the union of a node's rule set with the rule sets at all nodes that are undefeated path ancestors of the node. FIG. 7 shows that this suggested solution cannot work. If one starts out with the network of FIG. 6, and follows through on this method, one gets, for example, the union of the sets of rules at nodes 500, 501, and 503 at node 503. In particular, this means that one gets the following rule set at node 503: {w==>q, p, r v s, q v r, b==>~q, p==>q} (703). But this rule set is inconsistent with the background rule set {b}! (Since b and b==>~q yields~q, and p and p==>q yields q). Similarly, the rule set at node 506 using the strawman method turns out to be {w==>q, p, q v r, b==>~q, p==>q, r v s,~r,~s} (706). This set is not only inconsistent with the background context, it is in fact inconsistent with itself, since {r v s,~r,~s} is an inconsistent set. Clearly, blindly taking the union of rule sets is not the correct solution. In this disclosure, the union of rule sets is called the potential rule set.

Figure 8:
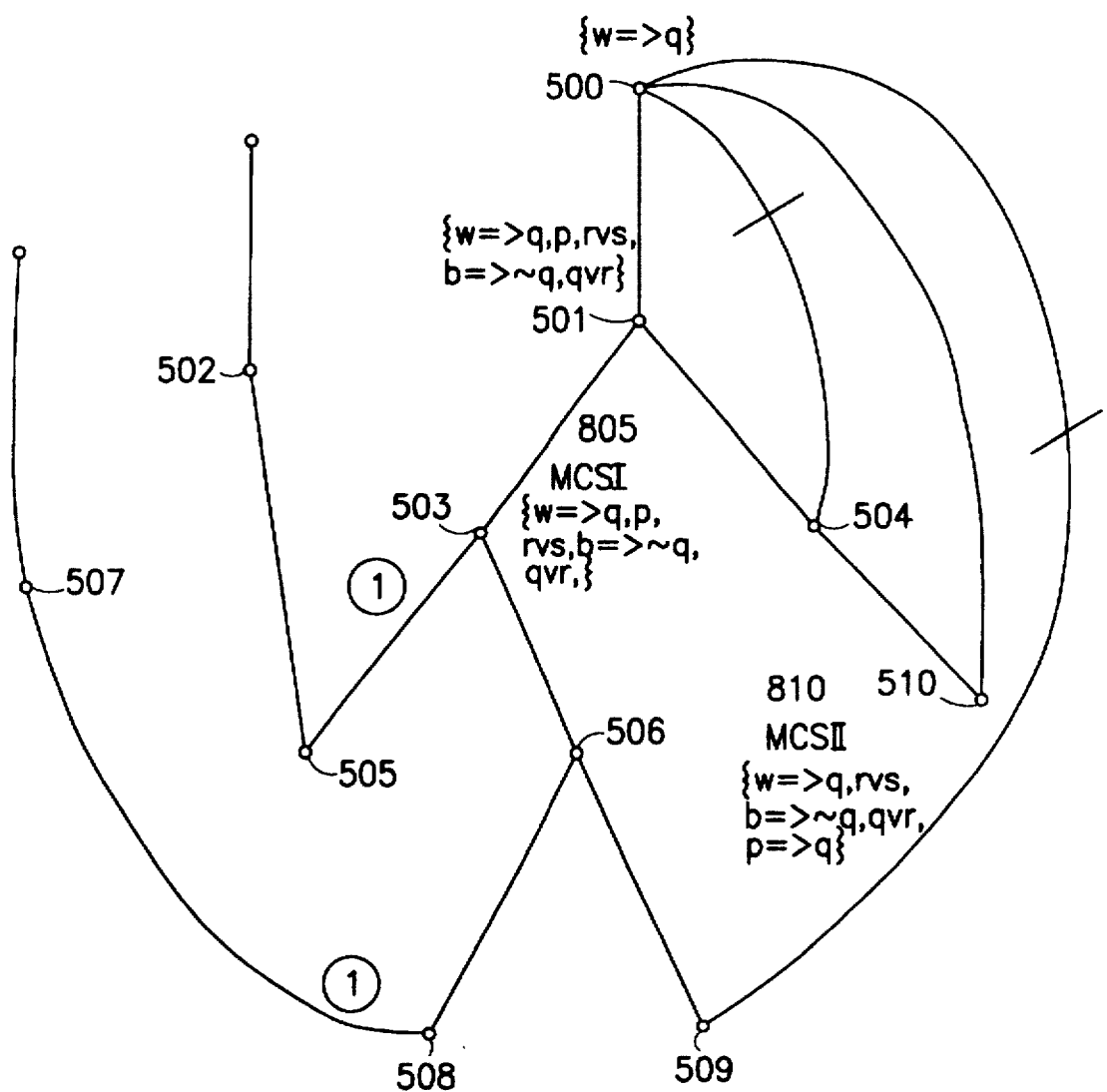
FIG. 8 is a network diagram showing one embodiment that determines the set of rules that apply to a node: taking maximally consistent subsets.

FIG. 8 discloses a possible solution to this problem. As before, one attempts to take the union of rule sets. However, if the union, i.e., the potential rule set, is inconsistent, one computes a maximally consistent subset of the potential rule set, relative to the background context; that is, one computes a subset S1 of S such that S1 union B (the background context) is consistent, and there does not exist a subset S2 of S where S2 is a proper superset of S1, and S2 union B is consistent. The maximally consistent subset is the set of rules that apply to the node in question.

In general, there may be more than one maximally consistent subset. For example, the maximally consistent rule sets at node 503 are {w==>q, p, r v s, b==>~q, q v r} (805) and {w==>q, r v s, b==>~q, q v r, p==>q} (810). Either of these sets are candidates for the set of rules that apply to node 503.

Figure 9:
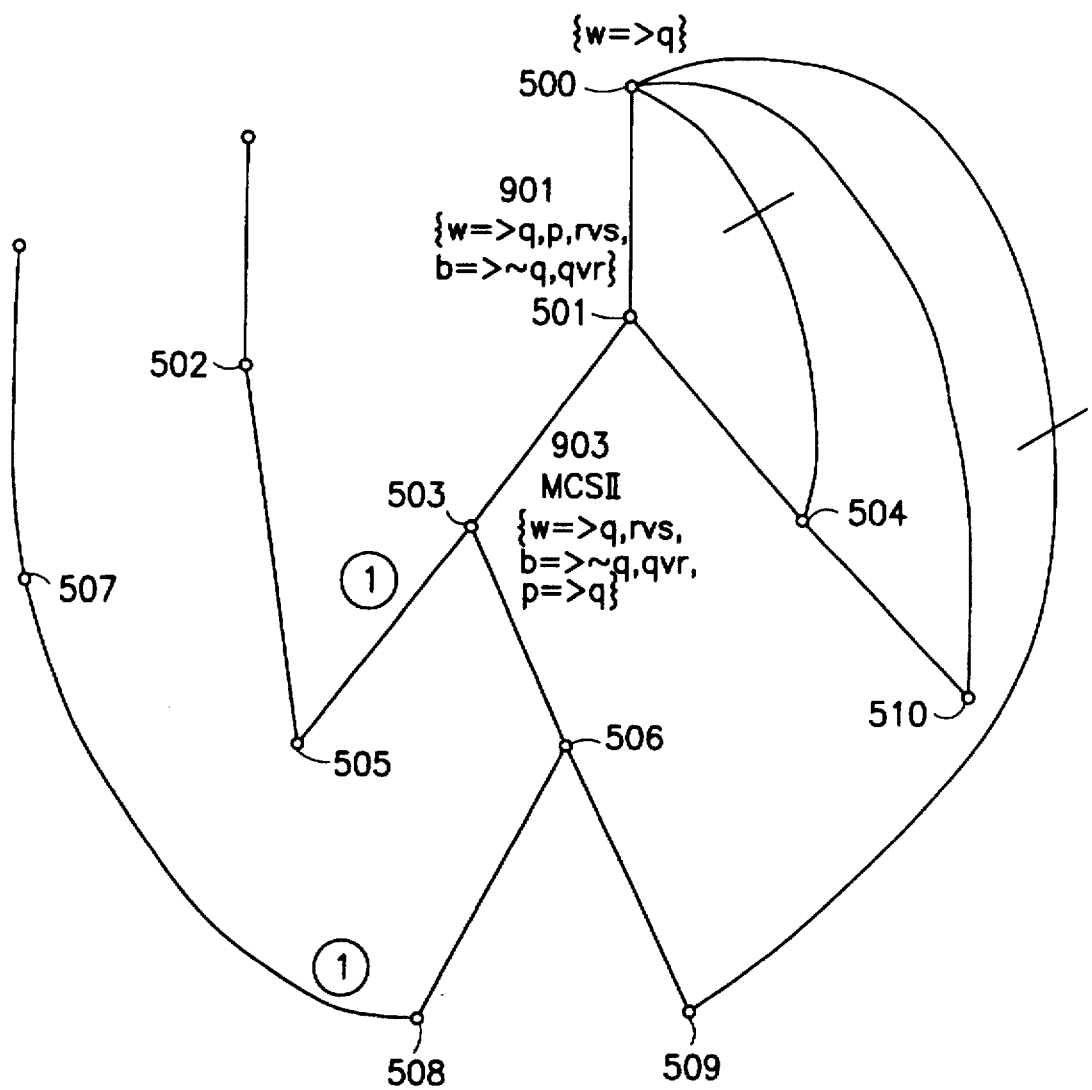
FIG. 9 is a block diagram shows a preferred embodiment that takes a preferred maximally consistent subsets in an inheritance hierarchy that is consistent and complete.

FIG. 9 discloses a preferred embodiment and an improvement to the solution suggested by FIG. 8. The maximally consistent subsets described in FIG. 8 are produced by deleting some of the rules in the inconsistent union set depicted in FIG. 7. The first maximally consistent subset {w==>q, p, r v s, b==>~q, q v r} (805) is obtained by deleting one of the rules (p==>q) that was attached to node 503; the second maximally consistent subset {w==>q, r v s, b==>~q, q v r, p==>q} (810) is obtained by deleting one of the rules (p) that was attached to node 501. But node 503 is a subclass of node 501; thus, it is more specific than node 501. Since node 503 is more specific than node 501, and since, presumably, specific rules typically override general rules, it is reasonable to argue that the rules attached to node 503 ought to have greater weight than the rules attached to node 501. Thus, the second maximally consistent subset is preferred to the first maximally consistent subset. This subset is called the preferred maximally consistent subset.

FIGS. 10 and 11a, 11b, and 11c give extended examples, similar to those of FIGS. 8 and 9, but emphasizing different features. The example network is the same as in FIG. 5, but different rules are attached to the nodes to simplify the exposition. The focus is on node 505 of the example network. This example differs from the previous example in two ways: First, node 505 has two parents (502, 503) (separate path multiple inheritance) and thus will inherit rules from both parents. Moreover, one link is preferred (538, the link between nodes 505 and 503, is preferred over 540, the link between nodes 505 and 502). Second, the example shows that there is a difference in results if one traverses the network upward or downward. Going upward will give the correct results; going downward will sometimes give incorrect results.

Figure 10:
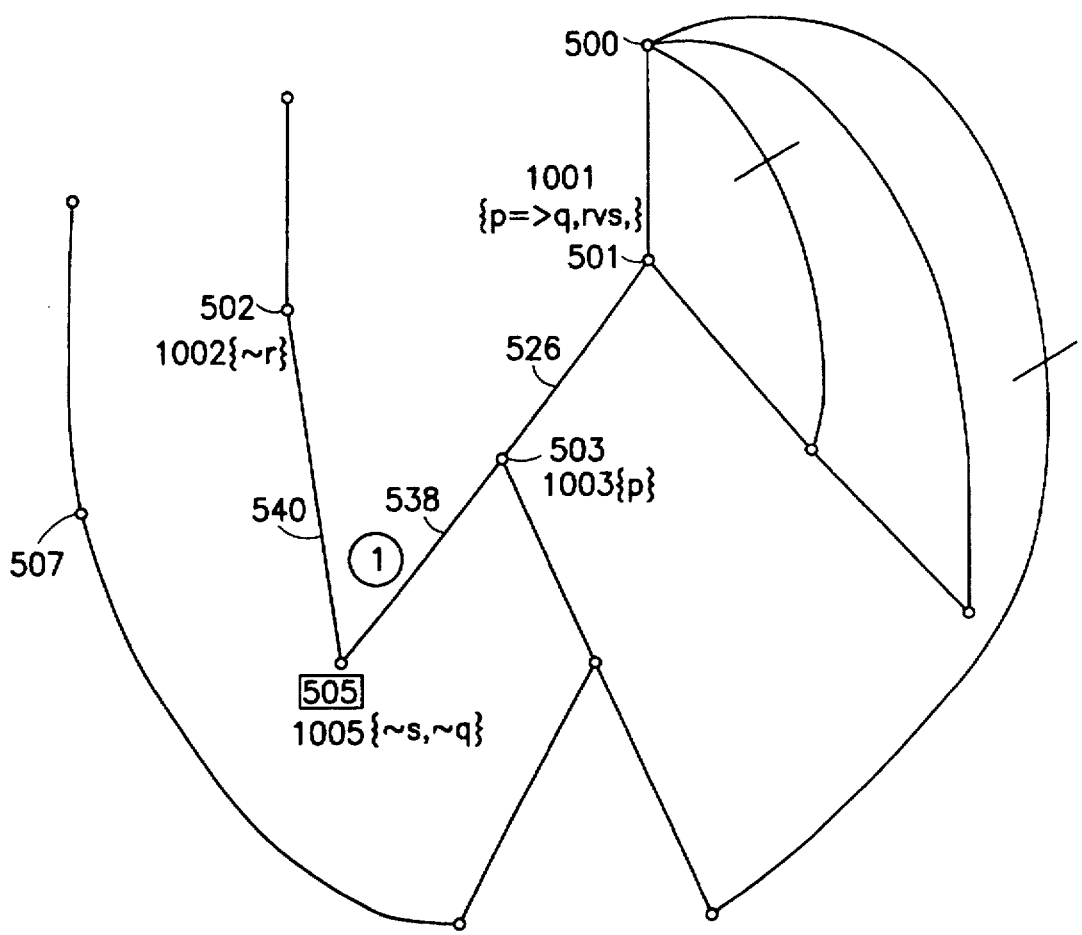
FIG. 10 is a network diagram showing how the method of taking maximally consistent subsets works in cases of prioritized links.

FIG. 10 shows the network with the following rule sets attached at the nodes:

The rule set {p==>q, r v s} (1001) is attached to node 501.

The rule set {~r} (1002) is attached to node 502.

The rule set {p} (1003) is attached to node 503.

The rule set {~s,~q} (1005) is attached to node 505.

As before, the background context B is {b, (d v e)==>f}.

It can easily be seen that naively taking the union of all nodes to which node 505 leads gives the set {p, p==>q, r v s,~r,~s,~q} which is inconsistent.

There are nine maximally consistent subsets:

(1021) {p==>q, ~q, r v s, ~s}

(1022) {p,~q, r v s,~s}

(1023) {p==>q, p, r v s,~s}

(1024) {p==>q, ~q, r v s,~r}

(1025) {p,~q, r v s,~r}

(1026) {p==>q, p, r v s,~r}
(1027) {p==>q,~q,~r,~s}
(1028) {p,~q,~r,~s}
(1029) {p==>q,p,~r,~s}

Figure 11A:
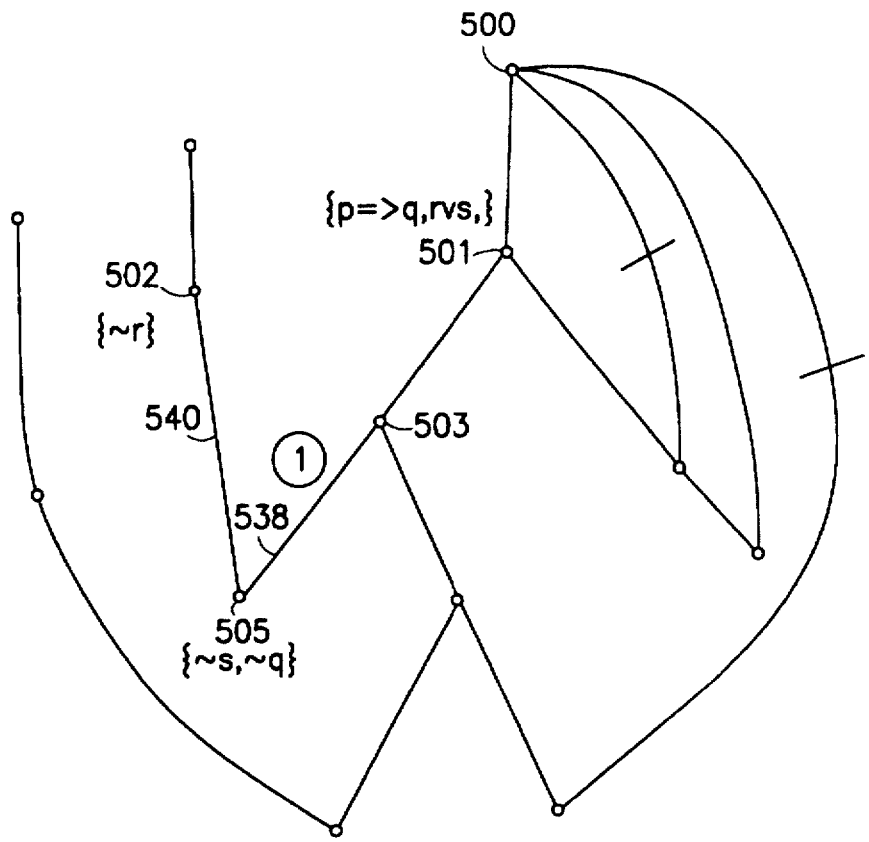
FIG. 11a is a network diagram showing how the method of taking preferred maximally consistent subsets works in cases of prioritized links.

Although each of these subsets is consistent, and thus a candidate for the set of rules that applies to node 505, some of these subsets are better than others. In particular, some of these subsets should be preferred because they have rules from more specific nodes, and some of these subsets should be preferred because they have rules from nodes that are on preferred paths. FIG. 11a explains how these preferred subsets are chosen.

FIG. 11 a shows how one can use specificity and preferred links to choose a preferred maximal consistent subset. As in FIG. 9, the specificity criterion is used in the following manner: Suppose there are two sets (e.g., (1021) and (1022) ), which are almost identical except that one set contains rules from a node that is more specific than another. Then one prefers the set that contains rules from a node that is more specific than another. In this example, (1021) and (1022) are almost identical, except that (1021) contains the rule p==>q and (1022) contains the rule p. The rule p comes from the node 503; the rule p==>q comes from the node 501. Moreover, node 503 is more specific than node 501. Thus, (1022) is preferred to (1021).

In the same manner, (1025) is preferred to (1024); (1028) is preferred to (1027); (1022) is preferred to (1023) (since~q comes from a node that is more specific than the node from which p==>q comes}; {1025) is preferred to (1026), and (1028) is preferred to (1029).

Thus, (1024), (1027), (1023), (1026), and (1029) are discarded. Moreover, (1022) is more specific than (1025), since~s comes from a more specific node (505) than does r v s (501).

Finally, the path prioritization criterion is used to eliminate (1028). Since r v s comes from node 501, and~r comes from node 502, and the path between 505 and 501 is preferred to the path between 505 and 502, the rule set with r v s is preferred to the rule set with~r. Thus, (1022) is preferred to (1028).

In general, the preferred maximally consistent subset need not be unique.

FIGS. 10 and 11a show that computing preferred maximally consistent subsets by taking the union of all rules at ancestors is clearly an expensive (time-consuming) operation in even simple cases. In practice, as will be shown in detail in FIGS. 17–19, the determination of preferred maximally consistent subsets can be done in a more efficient manner. Specifically, one can save resources by determining the preferred maximally consistent subsets iteratively; that is, to keep building preferred maximally consistent subsets at each node of a path, and to then proceed to the next node in the path, and to take the maximally consistent subset of the nodes at the new node with the set that has already been computed.

Figure 11B:
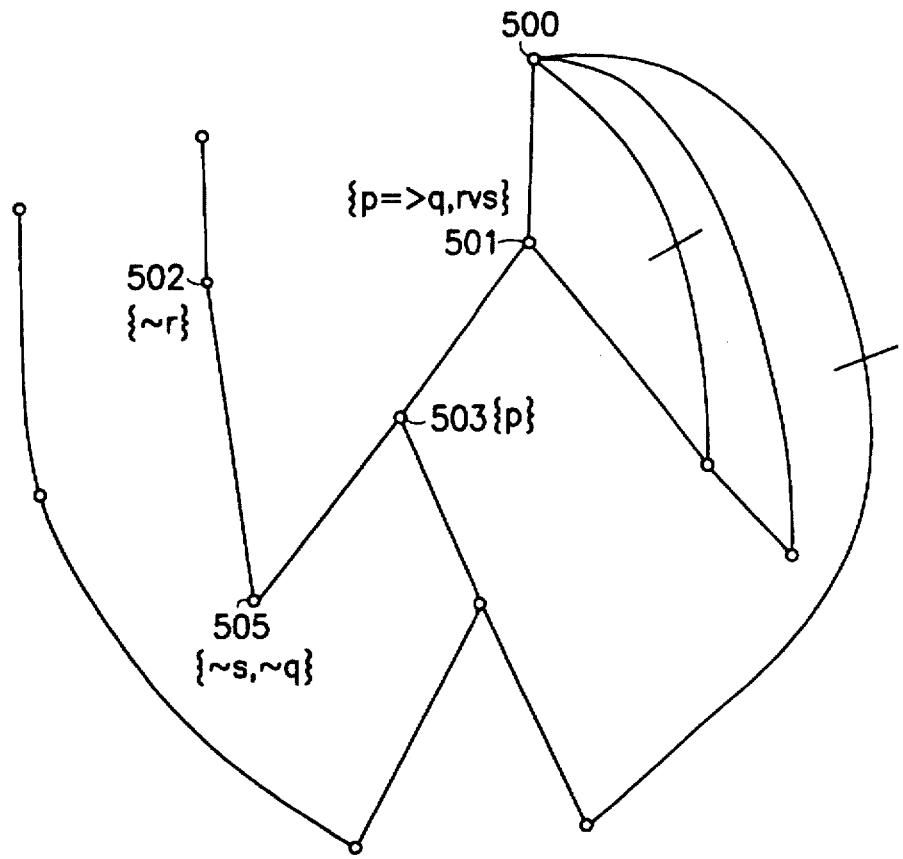
FIG. 11b is a network diagram showing why iterated computation of preferred maximally consistent subsets will not work with downward traversal.
Figure 11C:
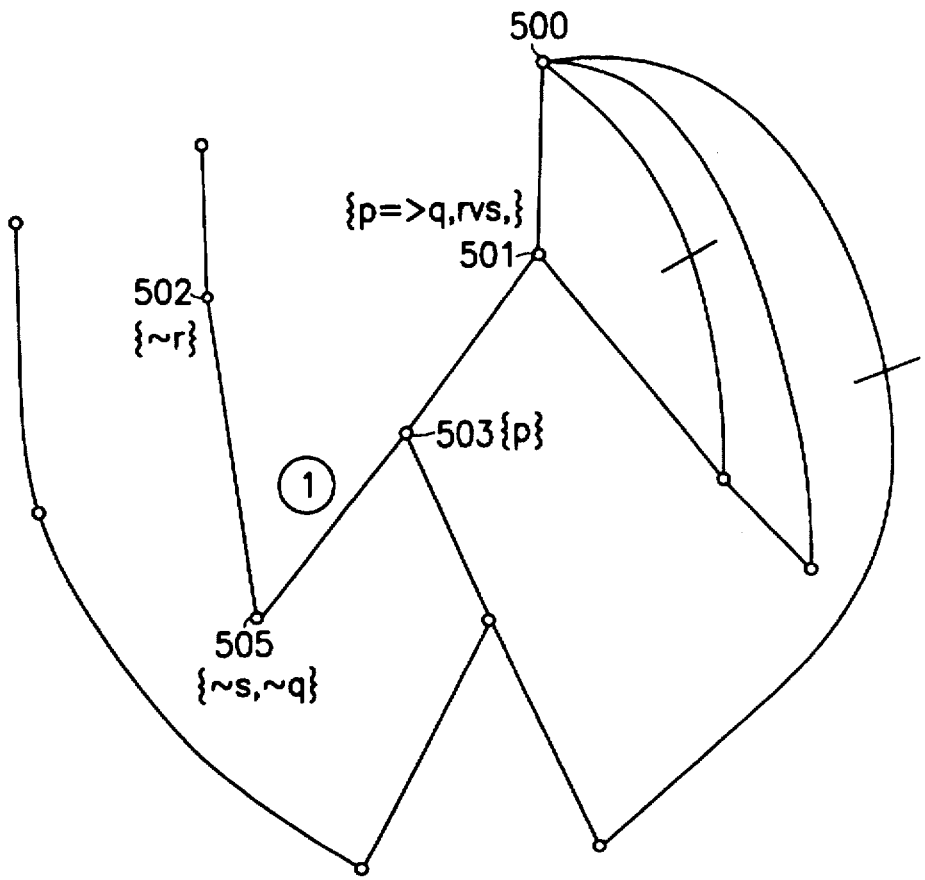
FIG. 11c is a network diagram showing that iterated computation of preferred maximally consistent subsets will work with upward traversal.

The question arises: should this process be upward or downward? FIGS. 11b and 11c show that the computation should be upward. FIG. 11b shows what would happen if one proceeded downward from node 500 to node 505. Since in this example there are no rules attached to node 500, the preferred maximally consistent subset of rules at 501 is equivalent to the rules attached to 501, namely, {p==>q, r v s}. Proceeding downward, one reaches node 503, and since there is no inconsistency, one obtains the preferred maximally consistent subset {p==>q, r v s, p}. When one reaches node 505, there is now inconsistency, since {p==>q, r v s, p,~s,~q} is inconsistent with respect to the background context. But the information that p comes from a node that is more specific than p==>q has now been lost. Thus, there is no way, for example, to prefer the maximally consistent subset {p, r v s,~s, b==>~q} to {p==>q, r v s,~s, b==>~q}. (Modifications on the downward method, such as keeping track of which node contributes which rules, may afford ways of doing a correct staged downward traversal.)

FIG. 11c demonstrates by example a preferred method of computing preferred maximally consistent subsets in stages: by traversing a path upward. Again, the focus is on node 505. Since there are two paths originating at node 505, the preferred path is traversed upward first; then the less preferred path is traversed upward. (This method will be generalized and formalized in FIGS. 17–19).

At Stage 1, one simply takes the rules that are attached to node 505, thus obtaining {~q,~s} (1121).

Next, (Stage 2), one goes up to node 503, and does a preferred maximally consistent subset with (1121) and the rules attached to node 503. There is no inconsistency here, so no need to take maximally consistent and preferred maximally consistent subsets. One obtains {~q,~s, p} (1122).

At Stage 3, one goes up to node 501, and takes the preferred maximally consistent subset of (1122) and the rules attached to node 501. Here the union {~q,~s, p, p==>q, r v s} is inconsistent; taking the preferred maximally consistent subset (preferring the rule set 1122) gives {~q,~s, p, r v s} (1123).

At Stage 4, one goes up to node 500. Since there are no rules attached to this node, one gets the same set as before {~q,~s, p, r v s} (1124).

This preferred path has now been completely traversed. In Stage 5, one goes up the less preferred path, arriving at node 502. One takes the preferred maximally consistent subset of rule set (1124) and the rule set attached to node 502. One gets {~q,~s,~p, r v s}.

Although the examples so far have demonstrated unique preferred maximally consistent subsets, in general this will not be the case; there may be several preferred maximally consistent subsets. In such a case, any preferred maximally consistent subset is an acceptable solution; one may nondeterministically or randomly choose any.

Figure 12:
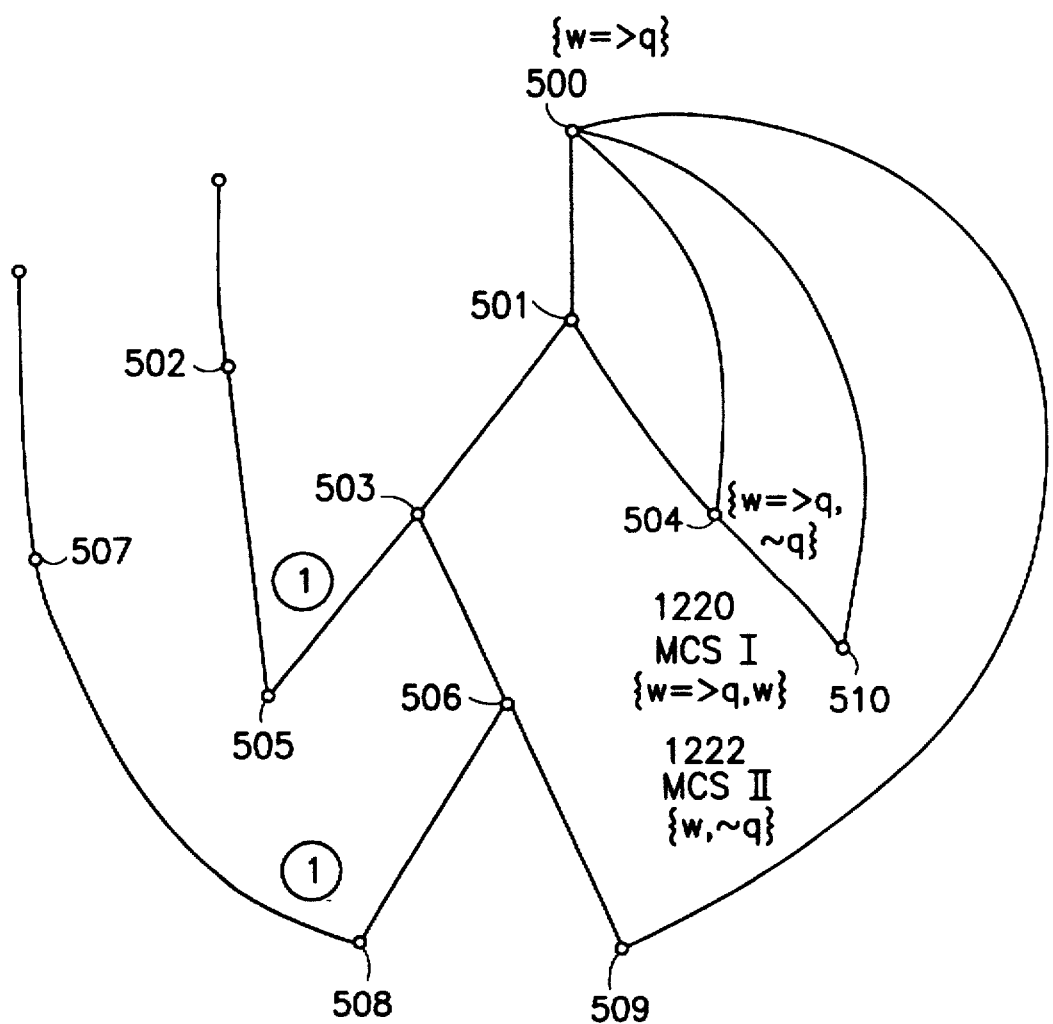
FIG. 12 is a network diagram showing how the method of taking maximally consistent subsets works in cases of preemptive inheritance.
Figure 13:
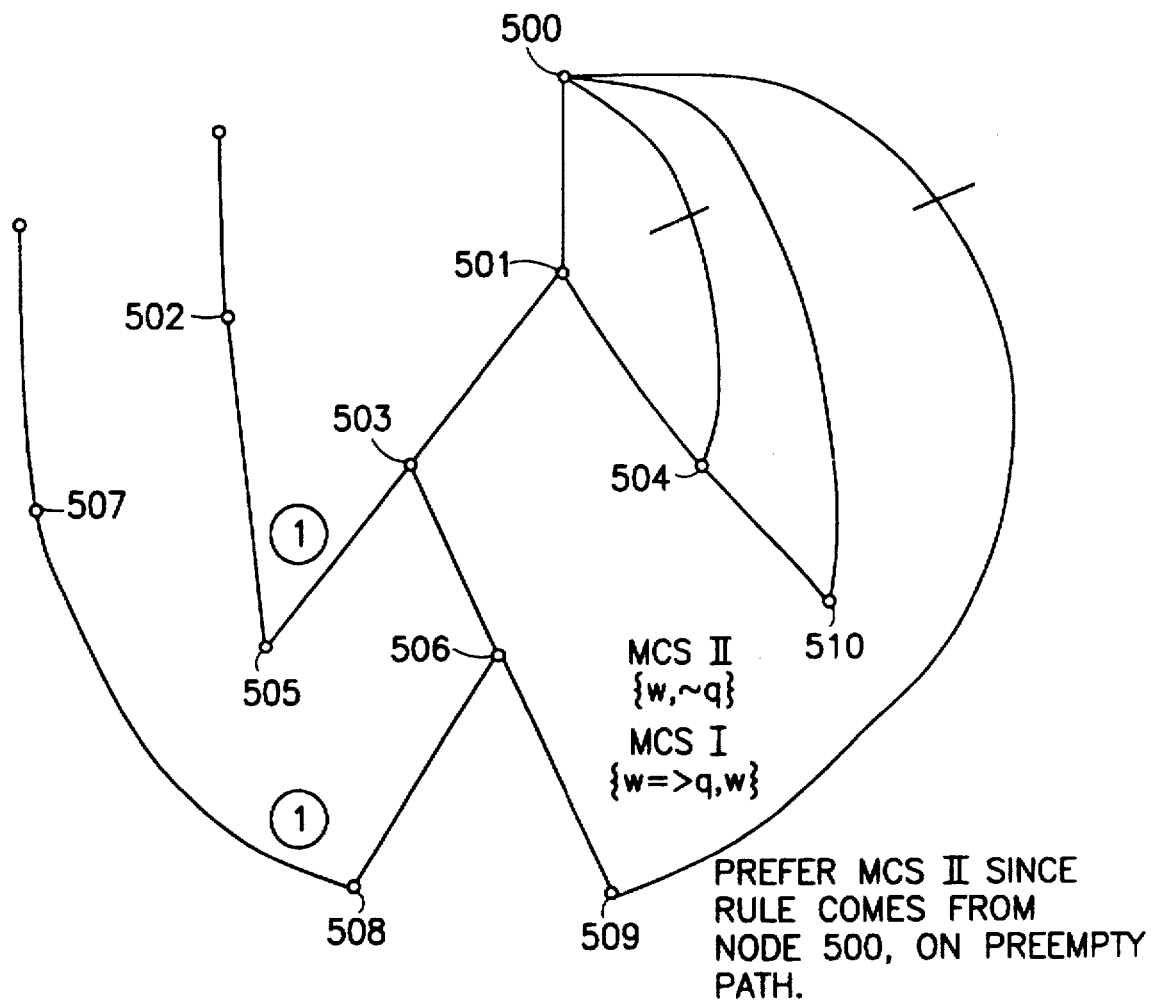
FIG. 13 is a network diagram showing how the method of taking preferred maximally consistent subsets works in cases of preemptive inheritance.

FIGS. 12 and 13 demonstrate a method for computing a preferred maximally consistent subset in case of conflicting path multiple inheritance. The network with rules is as in FIG. 6. In certain cases, it may be desirable that the rules that apply to the nodes of preempting path have priority over the rules that apply to the nodes of paths that are preempted (or challenged). Thus, FIG. 12 shows two maximally consistent subsets for node 510: {w==>q, w} (1220) and {~q,w} (1222). However, the first set is obtained by throwing out a rule from node 500 and keeping a rule from node 504. Since node 504 is on the challenged path and node 500 is on the preempting path, this is not desirable; one would rather throw out a rule from node 504 and keep a rule from node 500. Thus, the second set is the preferred maximally consistent subset, as indicated in FIG. 13.

It may not always be desirable that the nodes of preempting paths have priority over the nodes of challenged paths; thus, FIGS. 18a and 18b will give both methods.

FIG. 14 depicts what the network looks like in the computer's memory. The network consists of a set of nodes. Each node consists of a node number, or label (1402); a set of n pointers to parents (1404,1408), to each of which is possibly attached a number indicating its ordering (1405, 1409); a set of m pointers to children (1408,1410), and a set of k pointers to rules (1420, 1425). Each pointer to a child or parent itself points to a node in memory (1450) which represents the child or parent of the node containing the pointer. Each pointer to a rule points to the rule structure described in FIG. 15.

FIG. 15 depicts what a rule looks like in the computer's memory. Each rule consists of a rule label (1502) and a string (1504).

In some preferred embodiments, a field (1506) defining the rule type or category is used.

Figure 16:
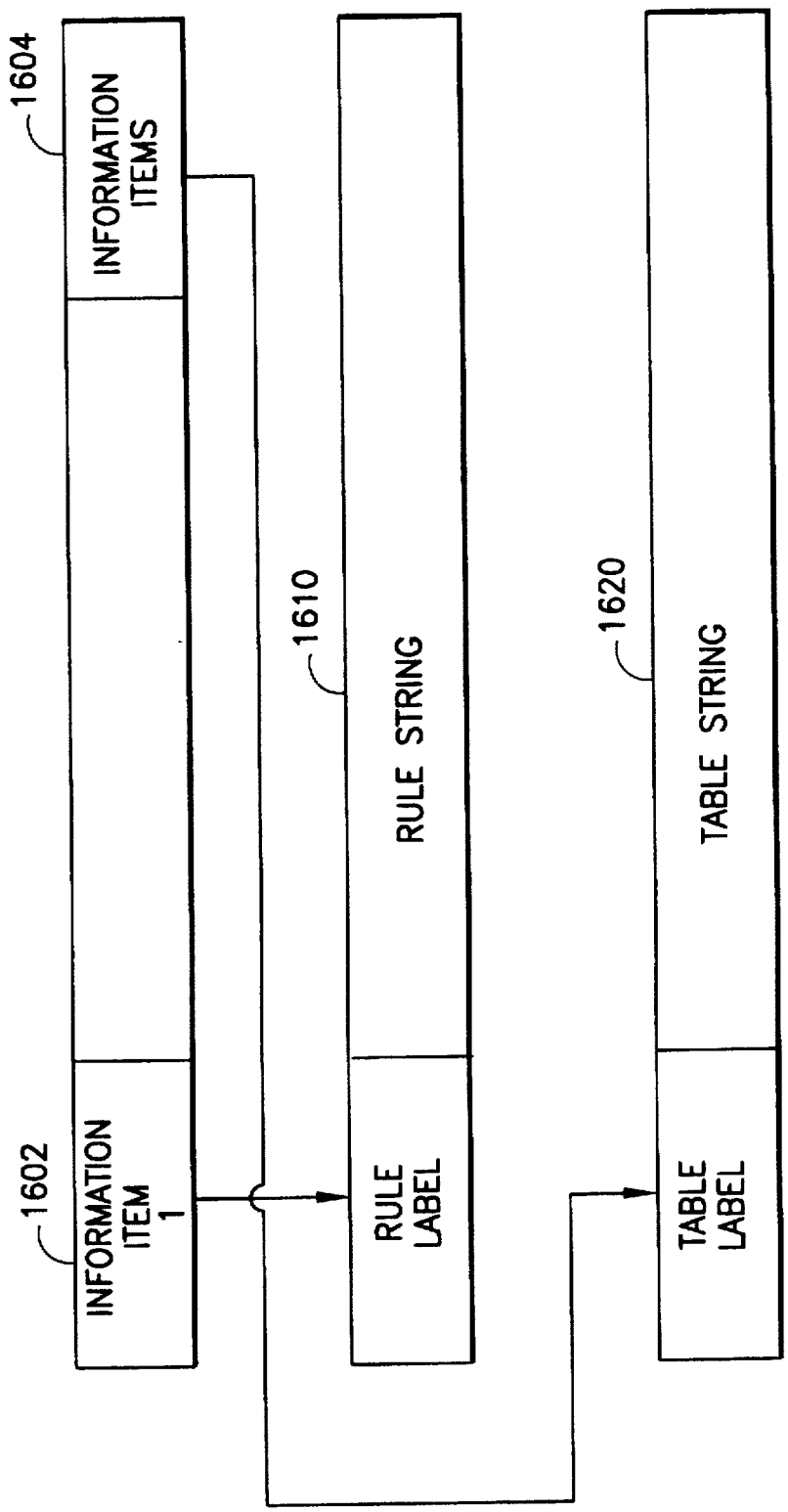
FIG. 16 is a block diagram depicting the representation of the background context in the computer's memory.

FIG. 16 depicts the background context. The background context consists of a set of pointers to background information items (1602, 1604). An information item may be a rule (1610), as in FIG. 15, or a more general structure, such as a table (1620).

Figure 17A:
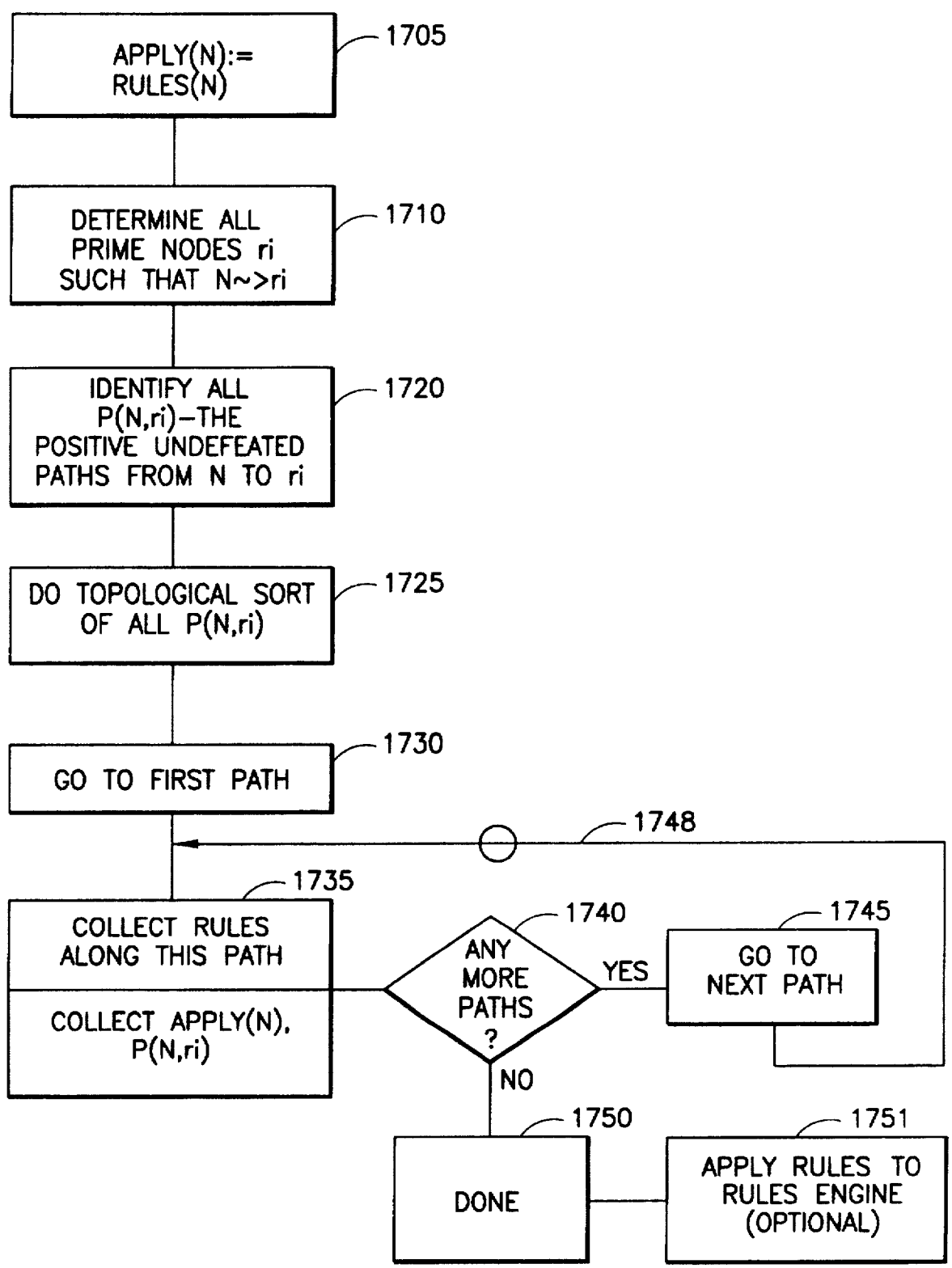
FIG. 17a is a flow chart of the process steps performed by the process used to determine the rules that apply to a node in the inheritance network.
Figure 17B:
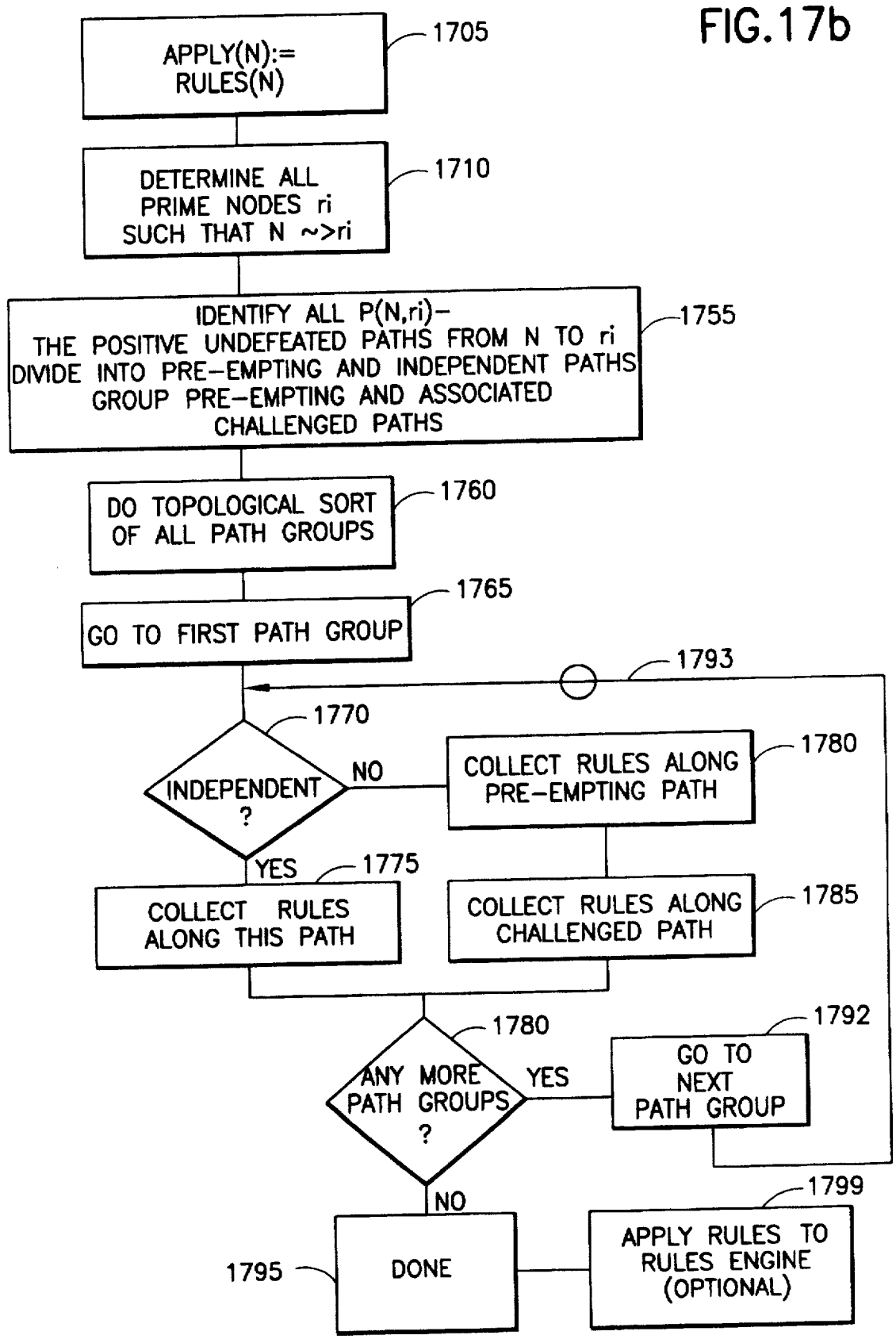
FIG. 17b is a flow chart of the process steps performed by the process used to determine the rules that apply to a node in the inheritance network, assuming a certain ordering between preempting and challenged paths.
Figure 18:
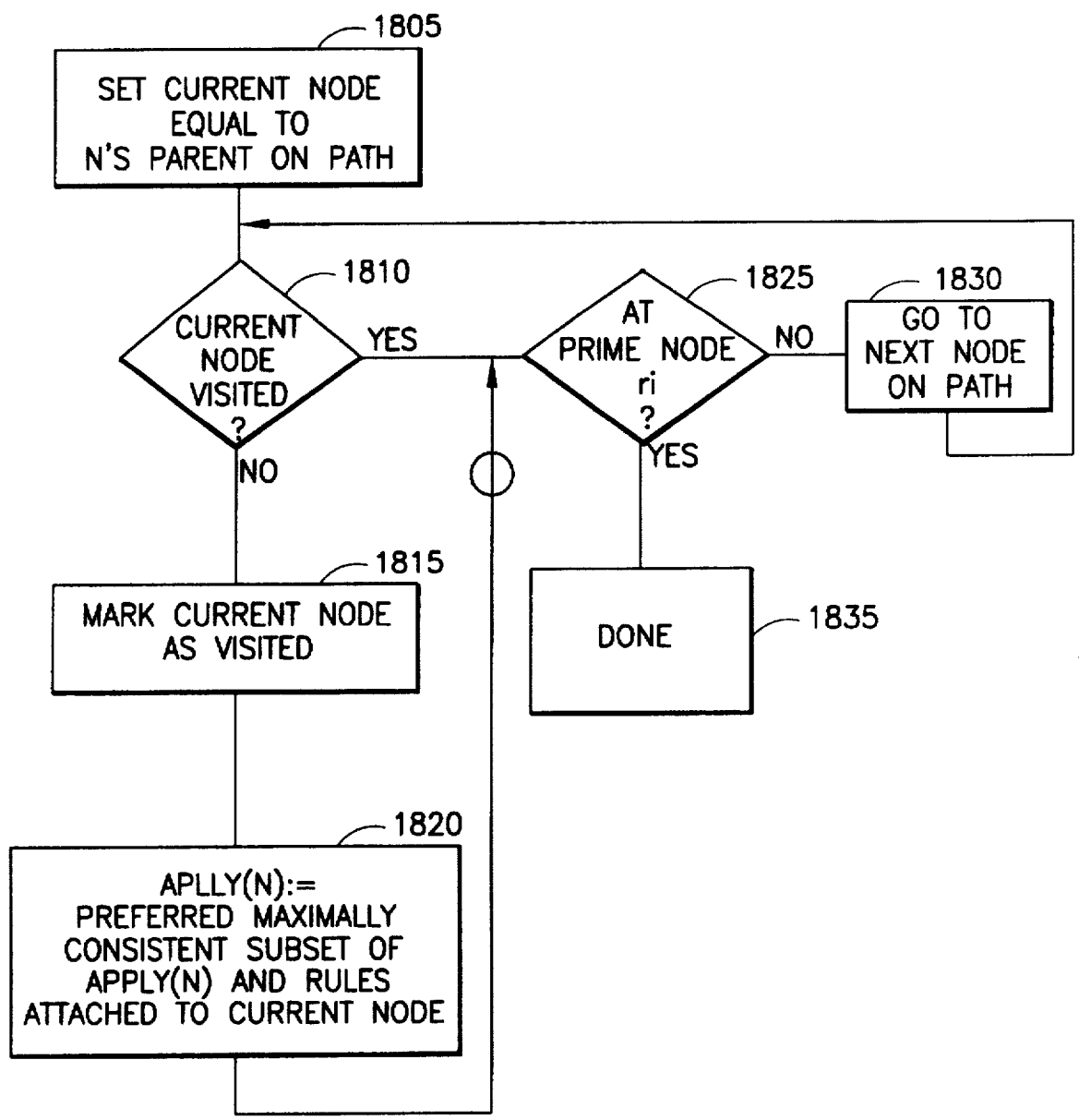
FIG. 18 is a flow chart of the process steps performed to collect the rules along a single path, part of the process described in FIG. 17.

FIG. 17, 18, and 19 describe the method used to determine which rules apply to a node in the inheritance hierarchy.

FIG. 17a gives a description of the method used to determine the set of rules that apply to a user selected node N in the network, called a focus node. First, the set of rules that apply to a given node (also called the collected rule set) is set equal to the rules attached to N (1705). Next, one determines all prime nodes ri such that there is a positive undefeated path between N and ri (1710). (Since each ri is a prime node, there is no node y such that y is a parent of ri and there is a positive undefeated path between N and y.)

Next, one identifies all the paths P(N,ri) between the focus node N and the prime nodes (1720). One does a topological sort of all such paths (1725). One proceeds to the first path (1730), and collects the rules along this path (1735) (this procedure is described in FIG. 18).

One then checks to see if there are any more paths to be traversed (1740). If there are more paths, one proceeds to the next path (1745), and again loops around to collect rules along this path (1735). If there are no more paths, the process is completed (1750). The output of this process is a preferred maximally consistent set of rules. In the application for which this process was developed, this preferred maximally consistent set of rules is input into a rules engine (1751). This means that the input to the rules engine is a consistent set of rules, with no conflicts. This solves the problem faced by today's rules engines, which generally have only ad-hoc methods of handling conflicts that are not always satisfactory. Step 1751 is optional; this method can be used independent of a rule-engine application or production system.

FIG. 17b describes the process used to determine the rules that apply to a focus node in the network if nodes on a preempting path are preferred to nodes on a challenged paths (as in the examples of FIGS. 12 and 13). This process shares certain steps of the process described in FIG. 17a.

As in FIG. 17a, one begins by setting the collected rule set equal to the set of rules attached to the focus node N (1705). Next, one determines all prime nodes ri where there is a positive undefeated path from N to ri (1710). Next, one identifies all such paths P(N,ri). One divides these paths into preempting and independent paths, and groups each preempting path with its associated challenged path(s) (1755).

Next, one does a topological sort of all path groups (1760). One proceeds by going to the first path group (1765). One checks to determine whether this path group is independent (1770). If it is independent, one simply collects rules along this path (1775). If it is not independent, one first collects rules along the preempting path (1780), and then collects rules along the challenged path (1785). In this way, the constraint that rules from nodes on preempting paths have priority over rules from nodes on their associated challenged paths is obeyed.

Once one has collected rules from the current path group, one checks to see if there are any more path groups to be traversed (1790). If there are more path groups, one proceeds to the next path group (1792), and loops around to again determine whether that path group is independent. If there are no more path groups, the process is completed (1795); if desired, the rules collected may be input to a rules engine (1799).

FIG. 18 describes the method used to collect rules as one goes up an undefeated positive path in the network (1735 in FIG. 17a; 1775, 1780, 1785 in FIG. 17b). (This process has been demonstrated by example in FIG. 11c.)

One begins by setting the current node equal to the parent of the focus node on the path that is being traversed (1805). Next, one checks to determine whether or not the current node has been visited (1810). If the current node has not been visited, one marks the current node as visited (1815), and then computes the preferred maximally consistent subset of the rule set that has been collected so far, and the rule set that is attached to the current node, to yield the newest version of the collected rule set (1820).

Once a node has been processed, one checks to see whether the prime node ri has been reached (1825). If the prime node has not been reached, one goes on to the next node in the path—that is, one sets the current node equal to the parent of the current node on the path that is being traversed (1830). One then loops around to check if the current node has been visited. If the prime node has been reached, the process is completed (1825).

Note that the processes explained in FIGS. 17a and 18 can be described using the following pseudocode:

Set Psi(N) (the set of rules that apply to N) to the rules attached to N.

Determine all prime nodes ri such that there is an undefeated positive path between N and ri.

Identify all P(N,ri) (the paths between N and ri).

Do a topological sort of all k paths.

```
For i = 1 to k do
    Set current node to N's parent on the i'th path
    Do until ri is reached
        if current node has not been visited then
            Psi(N): = pmcs(Psi(N),rules(current))
            mark current node as visited
        set current node to its parent on the ith path
``` where pmcs is the (random or nondeterministic) function that computes a single preferred maximally consistent subset of two sets of rules.

Figure 19A:
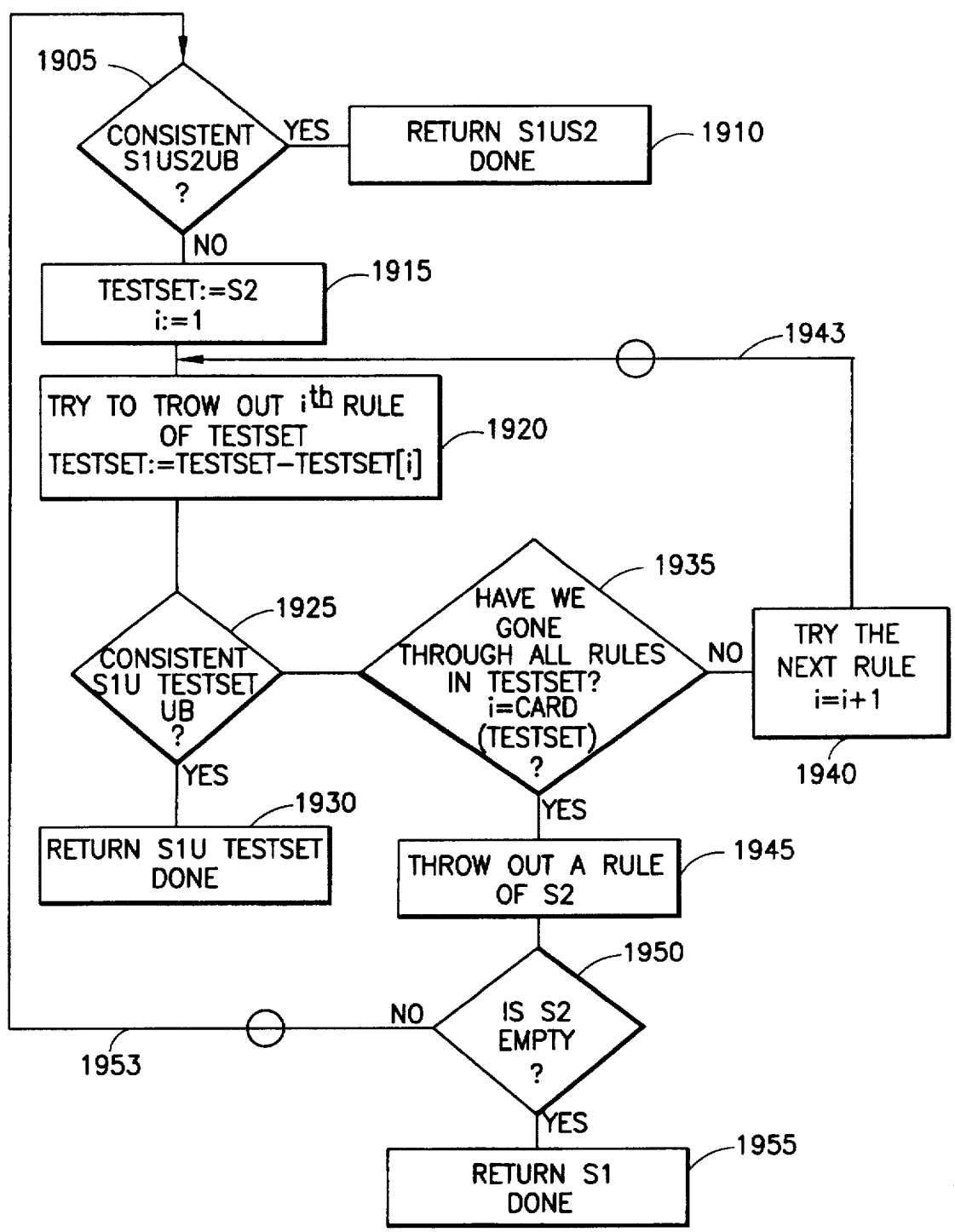
FIG. 19a is a flow chart of the process steps performed for one of the methods used to determine a preferred maximally consistent subset of two sets of rules, relative to a background context.
Figure 19B:
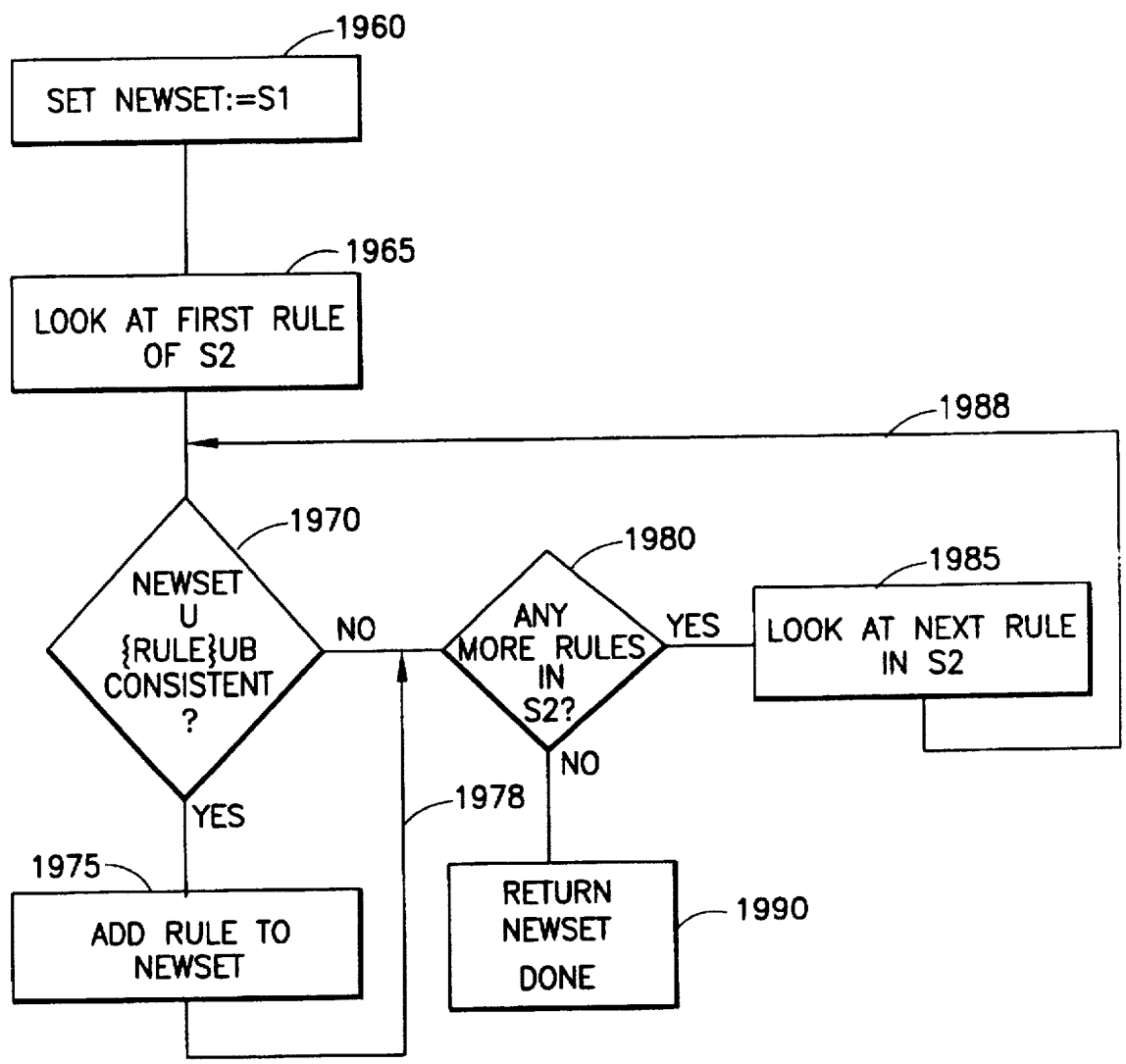
FIG. 19b is a flow chart of the process steps performed for another of the methods used to determine a preferred maximally consistent subset of two sets of rules, relative to a background context.

FIG. 19a and FIG. 19b describe methods used to determine preferred maximally consistent subsets. The following notation will be used: S1 is the more preferred set, S2 is the less preferred set, B is the background information.

FIG. 19a describes a method used to determine the preferred maximally consistent subset of two sets of rules, relative to background information B. It is assumed throughout that the first set mentioned is always the preferred set. The method works by trying to discard enough elements from the second set so that the union of the two sets is consistent.

First, one checks if the two sets are consistent with respect to each other and to the background rule set (1905). If they are consistent, the procedure is completed; one simply returns the union of the two rule sets (1910). If they are not consistent, one must proceed to throw out rules until one reaches a consistent set. One proceeds by trying to throw out rules from the less preferred set, one at a time. One begins with an initialization step, setting a counter (i) to 1 and the testset to the second set (1915).

One now throws out the ith element from the less preferred set (1920), and checks to see if this reduced set is consistent with the more preferred set and the background rule set (1925). If it is consistent, the procedure is completed, and one returns the union of the more preferred set with the reduced set (1930). If it is not consistent, one tries to throw out a different (but not an additional) element of the less preferred set. One first checks to see if one has tried throwing out each individual element of the less preferred set (1935). If one has not, one tries the next rule, incrementing the counter i (1940), and loops around (1943) to proceed to throw out a different element of the less preferred set (1920). If one has tried throwing out each individual element of the less preferred set, one must throw out more than one element of the less preferred set. Thus, one must permanently throw out one rule of the less preferred set, and then try again to discard one of the remaining rules. Thus, one throws out a rule of S2 (1945). A test is performed to see if the less preferred set is empty (1950). If it is empty, then the less preferred set is entirely inconsistent with the more preferred set and the background rule set. One therefore simply returns the more preferred rule set and ends (1955). Otherwise, one takes the diminished set of less preferred rules, and again loops around (1953) to try to throw out individual elements of this reduced set (1905).

FIG. 19b describes an alternate method to compute the preferred maximally consistent subset of two sets. In this method, rules from the second set are examined individually to see if they are consistent with the first set. Again, it is assumed that the first set mentioned is preferred.

One begins by setting the new set (preferred maximally consistent subset) to the first set (1960). One then looks at the first rule of the second set (1965). If this rule together with the new set forms a consistent set with respect to the background context (1970), one adds the rule to the new set (1975). One then proceeds to examine if there are any more rules in S2 (1980). If the rule together with the new set is not consistent with respect to the background context, one leaves the new set unchanged, and immediately proceeds to examine if there are any more rules in S2 (1980). If there are more rules in S2, one looks at the next rule (1985), and returns to check the consistency of this rule with the new set (1970). Otherwise, if there are no more rules in S2, the procedure is completed, and one simply returns the new set (1990).

Either of these methods will accurately compute the rules that apply to the nodes in the network. However, these methods may take exponential time to compute. FIGS. 20 through 23 discuss an alternative preferred divide-and-conquer method which allows one to avoid this exponential complexity.

Figure 20:
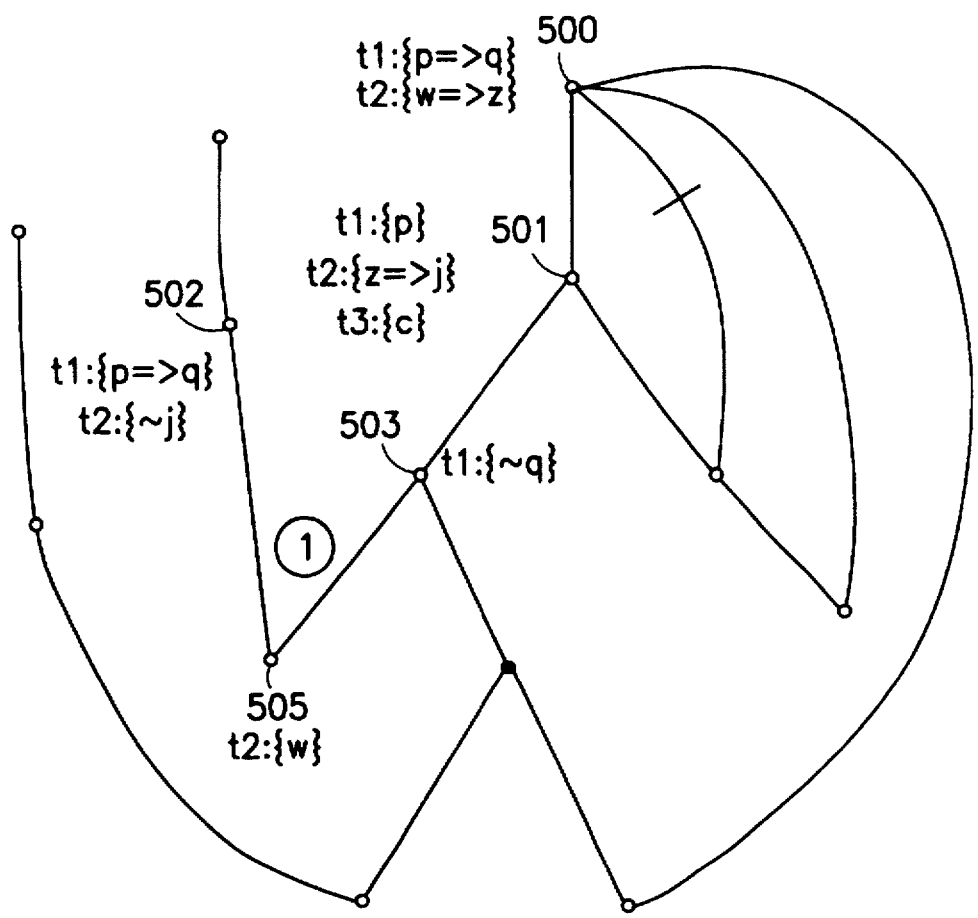
FIG. 20 is a network diagram depicting the inheritance hierarchy with rules categorized according to type attached to nodes.

FIG. 20 depicts the inheritance hierarchy with an added novel feature: the rule sets are categorized by type. For example, node 500 has rule sets of 2 types—type t1 and type t2; node 501 has rule sets of 3 types—t1, t2, and t3. (The rules attached to each node are different in this example from previous examples.) The rule sets must obey the following constraint: each rule set is consistent will all rule sets that are of a type other than their own. So, for example, a rule set of type t1, no matter which node it is at, is constrained to be consistent with rule sets of type t2, anywhere in the network. Also, a rule set of type t1, no matter which node it is at, is constrained tp be consistent with rule sets of type 3 anywhere in the network. Similarly, rule sets of type2 are constrained to be consistent with rule sets of type 3 anywhere in the network. However, the rules of type 1 at one node may be inconsistent with the rules of type 1 at another node.

This feature allows a natural representation of business rules. For example, a medical insurance company may categorize its rules as cost-share rules, access rules, administration rules, or medical rules. In addition, it is often the case that these rule types obey the consistency constraint mentioned above; an access rule, for example, will never contradict a medical rule, and a medical rule will not contradict an access rule.

Figure 21:
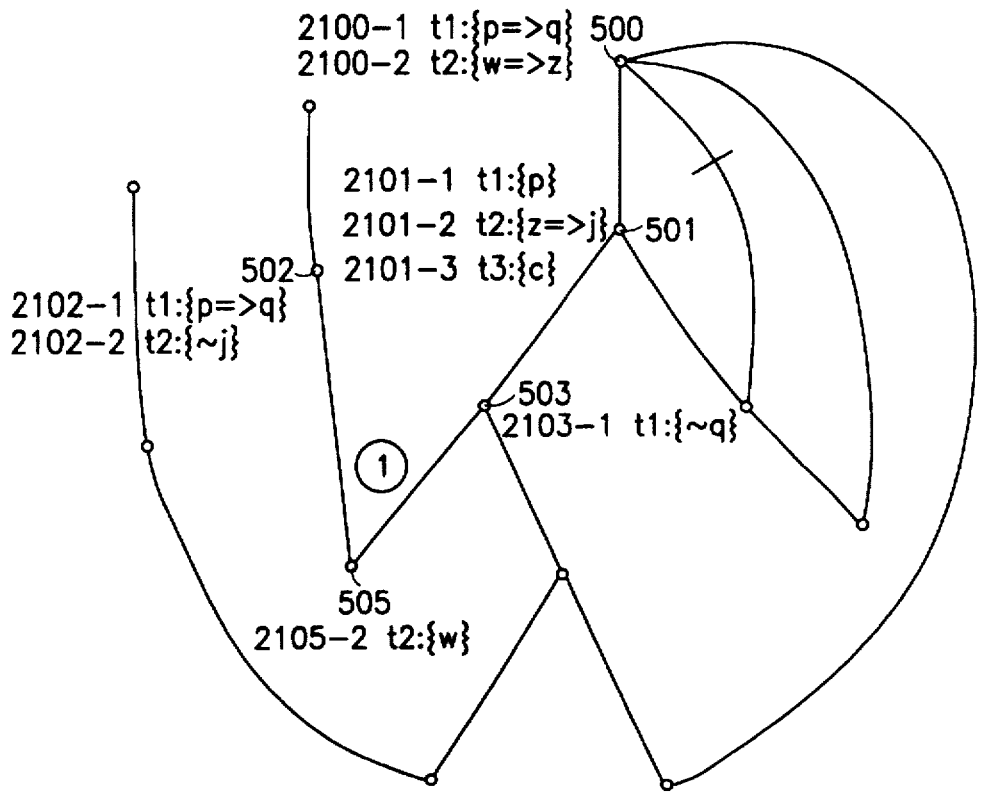
FIG. 21 is a network diagram depicting how an inheritance hierarchy with rules categorized by type can make computation of preferred maximally consistent subsets more efficient.

FIG. 21 illustrates how this feature can be exploited in order to make the computation more efficient. Because large sets of rules are divided into small sets of rules, and because consistency checking and computing a preferred maximally consistent subset need only be done for small sets, the complexity is reduced considerably. Consider, for example, computing the rules that apply to node 505.

In Stage 1, one simply takes the rules that are attached to node 505 (t2: {w}).

For Stage 2, one proceeds to node 503. Since there are no rules of type 2, there is no need to do a consistency check. The rules that apply to node 505 so far are t1 {~q}, t2{w}. Without the categorization by type, this step would have necessitated a consistency check of the set {w,~q}.

For Stage 3, one proceeds to node 501. Here there are rules of types 1, 2, and 3. Thus, one must perform a consistency check of {~q,p} (for t1), and {w, z==>j} (for t2). Since rules of t3 have not appeared before, this rule set can simply be collected. Thus, there was a need at this stage of a consistency check on a set of 3 literals, and one of 2 literals—roughly 12 operations. On the other hand, without a categorization by type, this step would have necessitated a consistency check of a set 6 literals—roughly 2 to the 6th, or 64 operations.

The increased efficiency becomes more apparent in Stage 4, as one proceeds to node 500. Here adding the rules at node 500 produces inconsistency. Taking maximally consistent subsets of 7 formulas is much more time consuming than taking maximally consistent subsets of a set of 3 formulas {p,~q, p==>q}.

The savings is increased at Stage 5, as one proceeds to node 502. The reason is that it is almost always cheaper to do many operations to small sets than few operations to large sets.

Figure 22:
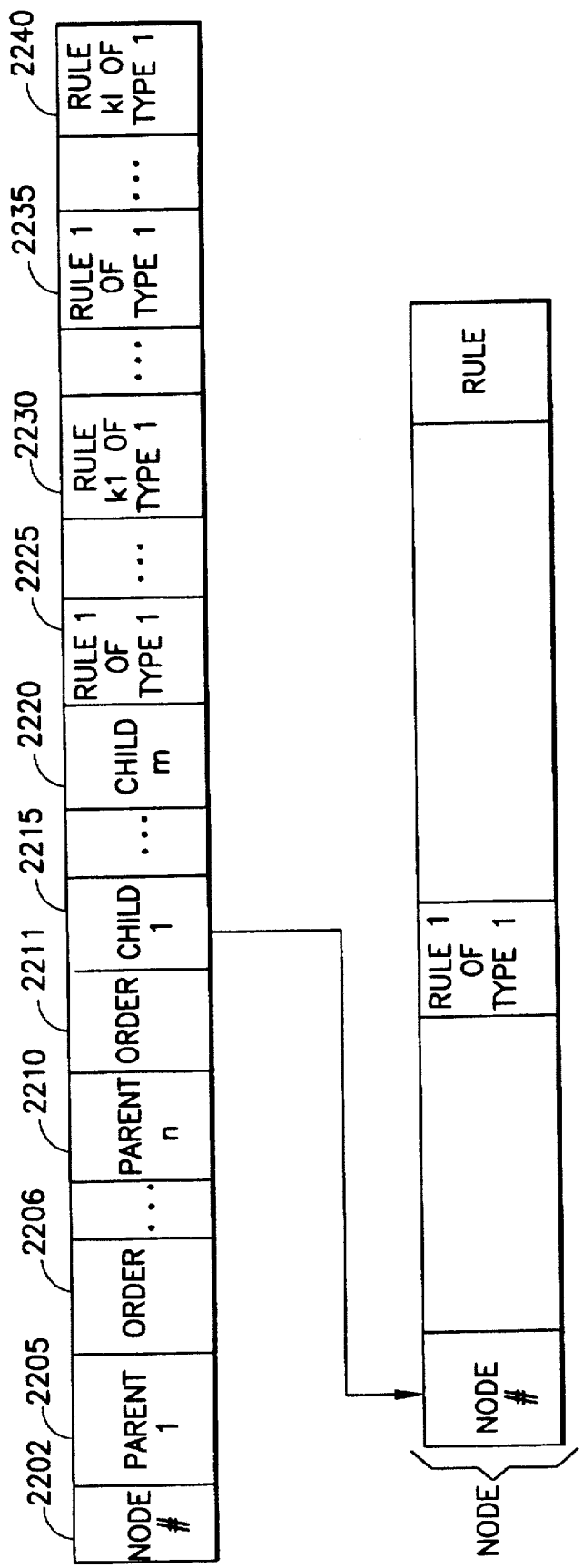
FIG. 22 is a block diagram depicting the modified inheritance hierarchy (with rules categorized by type) and nodes in memory.

FIG. 22 depicts how the modified inheritance hierarchy looks in memory. A node is somewhat modified from its former depiction in FIG. 14. It still has a node number (2202), n parents with orderings (2205, 2206, 2210, 2211), and m children (2215, 2220). However there are now l sets of rules, corresponding to l different types. There are k1 rules of type 1 in the node (2225,2230), and so on, onto kl rules of type 1 (2235,2240).

Figure 23A:
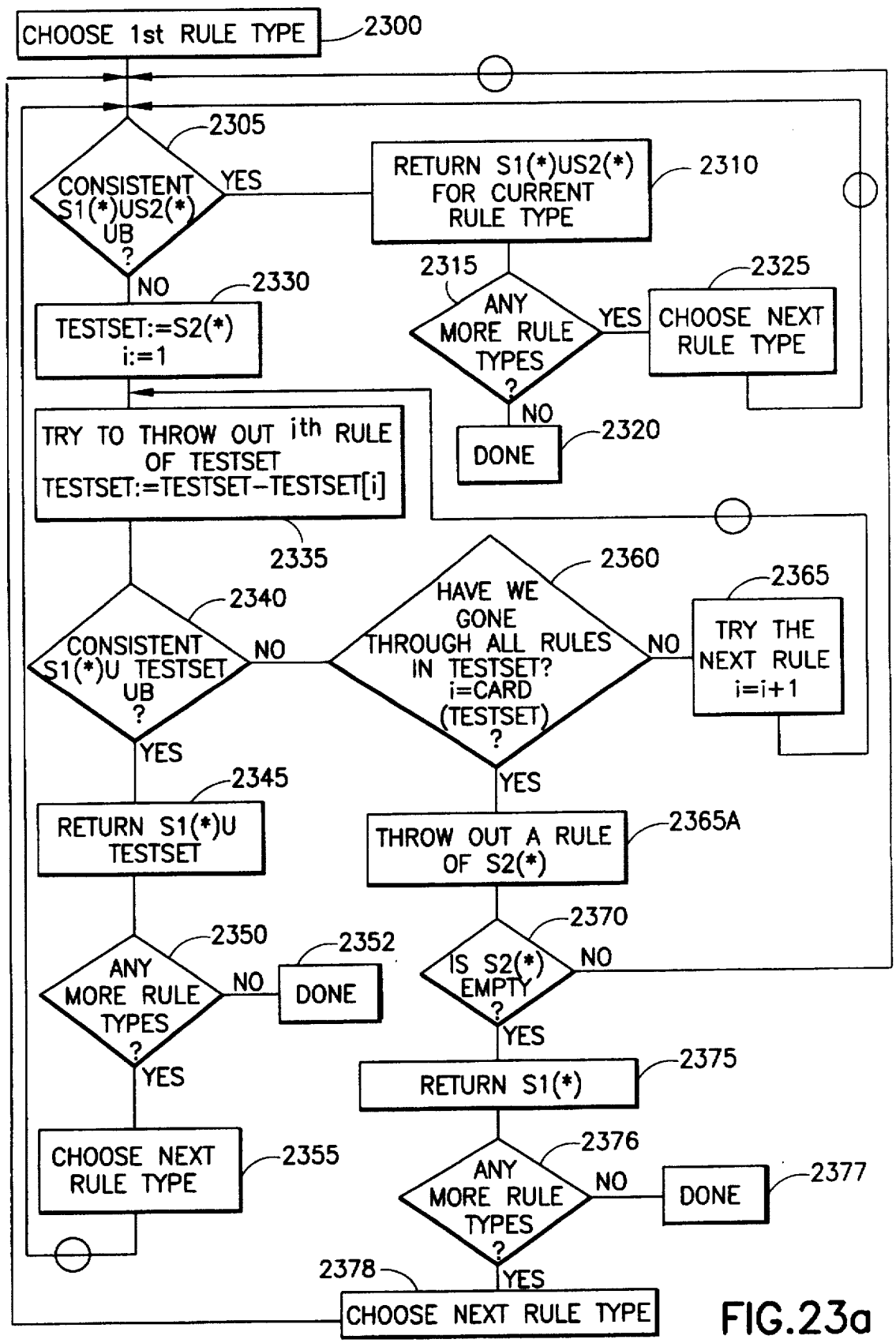
FIG. 23a is a flow chart of the process steps performed for one of the methods used to determine a preferred maximally consistent subset of sets of rules at a node, relative to a background context, when rules are categorized by type.
Figure 23B:
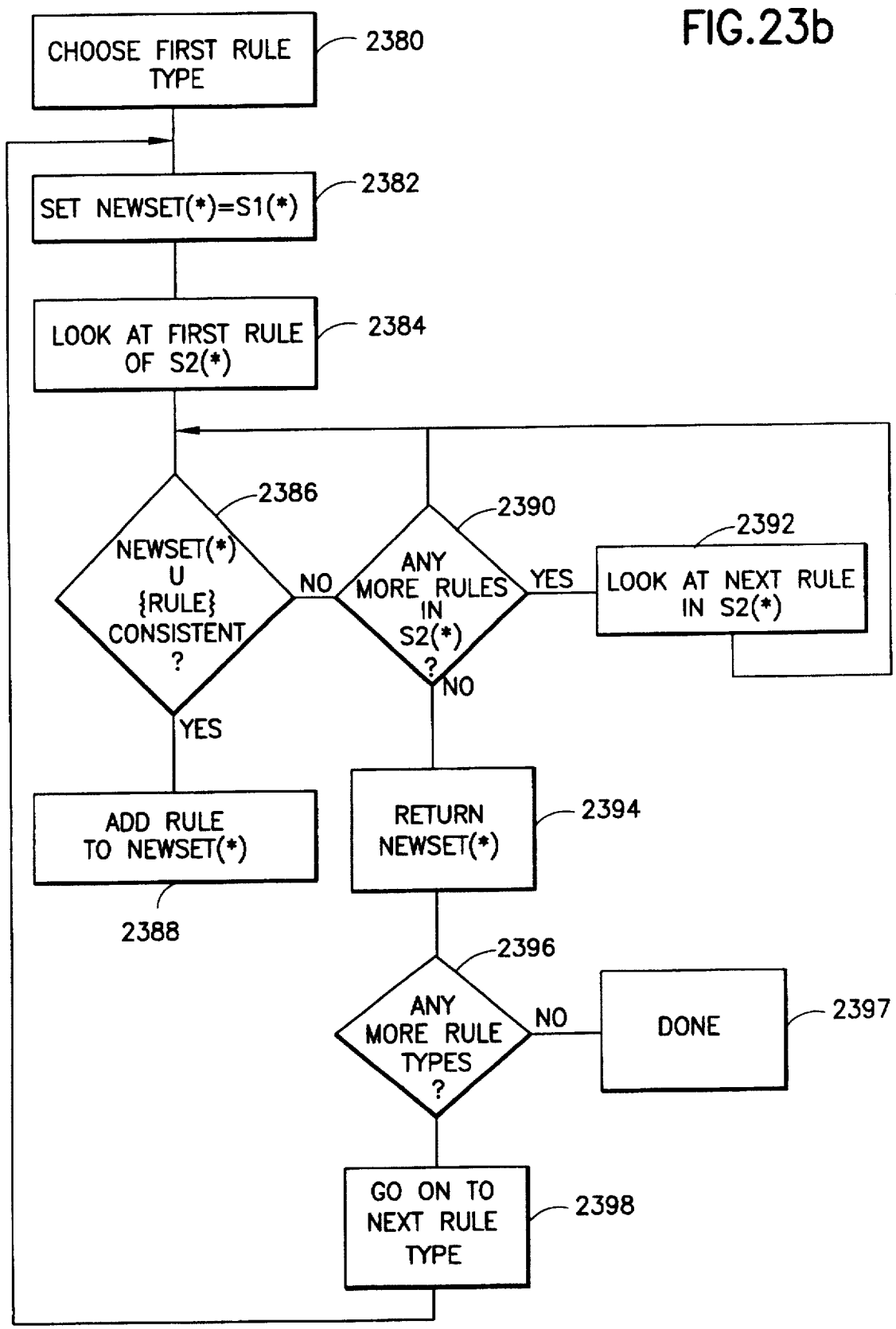
FIG. 23b is a flow chart of the process steps performed for another of the methods used to determine a preferred maximally consistent subset of sets of rules at a node, relative to a background context, when rules are categorized by type.

FIG. 23a illustrates the process used to determine preferred maximally consistent subsets for this modified hierarchy. For the most part, the process to compute the set of rules that applies to a node remains unchanged. Thus, FIGS. 17 and 18 are still valid here. However, FIG. 19 needs to be modified somewhat. FIG. 23a gives the modification for FIG. 19a and FIG. 23b gives the modification for FIG. 19b. In order to figure out the preferred maximally consistent subset, one must figure out the preferred maximally consistent for each of the l rule types. Thus, FIG. 23a puts an external loop around the main parts of FIG. 19a; FIG. 23b puts an external loop around the main parts of FIG. 19b.

The following notation will be used in the description of FIGS. 23a and 23b: S1 is the more preferred set; S2 is the less preferred set; S1(*) is the set of rules of the current type in S1; S2(*) is the set of rules of the current type in S2; and B is the background context.

23

In FIG. 23a, one begins by choosing the first rule type (2300). One checks to see if S2(*) is consistent with S1(*) and the background context (2305). If it is consistent, one returns S1(*) union S2(*) for the current rule type (2310). One then checks to see if there are any more rule types (2315). If there are no more rule types, the procedure is completed (2320). Otherwise, one chooses the next rule type (2325), and proceeds to check the consistency of the two sets, with respect to the background context, for the new rule type (2305). If S2(*) is not consistent with S1(*) and the background context, one now does precisely what was done in FIG. 19a. That is, one begins with an initialization step, setting a counter (i) to 1 and the testset to the second set of rules for that rule type (2330).

One now throws out the ith element from testset (2335), and checks to see if this reduced set is consistent with the more preferred set and the background rule set (2340). If it is consistent, one returns the union of the more preferred set with the reduced set (2345). One now tests to see if there are any more rule types (2350). If there are none, the procedure is completed (2352). Otherwise, one chooses the next rule type (2355), and loops around to perform this procedure for the next rule type (2305).

If it is not consistent, one tries to throw out a different (but not an additional) element of the less preferred set. One first checks to see if one has tried throwing out each individual element of the less preferred set (2360). If one has not, one tries the next rule, incrementing the counter i (2365), and loops around (2368) to proceed to throw out a different element of the less preferred set (2335). If one has tried throwing out each individual element of the less preferred set, one must throw out more than one element of the less preferred set. Thus, one must permanently throw out one rule of the less preferred set, and then try again to discard one of the remaining rules. Thus, one permanently throws out a rule of S2(*) (1965). A test is performed to see if S2(*) is empty (2370). If it is empty, then the less preferred set is entirely inconsistent with the more preferred set and the background rule set. One therefore returns the more preferred rule set (2375). One then checks to see if there are any more rule types (2376). If there are none, the procedure is completed (2377). Otherwise, one goes on to the next rule type (2378), and loops around to perform the procedure for that rule type (2305). The numbers 2376, 2378, and 2377 do not appear in the figure??

FIG. 23b describes another method for determining preferred maximally consistent subsets for different categories of rules, corresponding to FIG. 19b.

One begins by choosing the first rule type (2380). One sets the newset for this type of rule (newset(*)) to the first set (2382). One then looks at the first rule of this type of the second set (2384). If this rule together with the new set forms a consistent set, relative to the background context (2386), one adds the rule to the new set (2388). One then proceeds to examine if there are any more rules in S2(*) (2390). If the rule together with the new set is not consistent, one leaves the new set unchanged, and immediately proceeds to examine if there are any more rules in S2 (2390). If there are more rules in S2, one looks at the next rule (2392), and returns to check the consistency of this rule with the new set relative to the background context (2386). Otherwise, if there are no more rules in S2(*), one returns newset(*) for that rule type (2396), and then proceeds to check if there are any more rule types (2396). If there are more rule types, one proceeds to the next rule type (2398), and loops around to compute the preferred maximally consistent subset for that rule type (2382). Otherwise, if there are no more rule types, the procedure is completed (2397).

24

Figure 24:
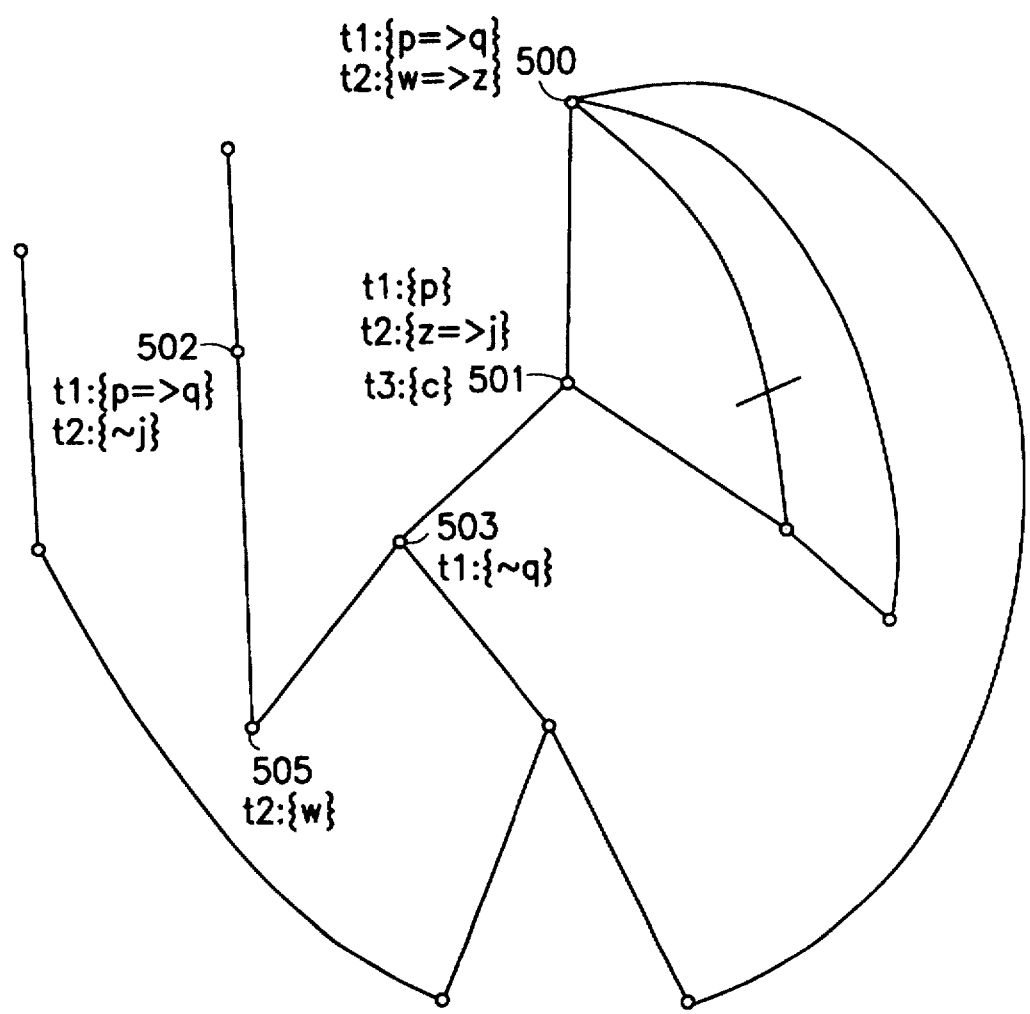
FIG. 24 is a network diagram depicting the inheritance hierarchy with rules attached to nodes, rules categorized by type, where different link preferences may be given for different rule types.

FIG. 24 depicts the inheritance hierarchy with rules categorized by type, but with an added novel feature: there are different link preferences for different rule types. That is, if a node has multiple parents, one link may be preferred for one rule type and another link may be preferred for another rule type. For example, if insulin syringes is a subtype of both drugs and supplies, the link between insulin syringes and drugs may be preferred to the link between insulin syringes and supplies for cost-share rules, but the link between insulin syringes and supplies may be preferred to the link between insulin syringes and drugs for administrative rules. This is a common feature of rules in the actual business world, where preferences are rarely absolute and are generally relative to a type of rule.

In the example depicted in the hierarchy, the link between nodes 505 and 502 is preferred to the link between nodes 505 and 503 for rules of type t1; the link between nodes 505 and 503 is preferred to the link between nodes 505 and 502 for rules of type t2.

Figure 25:
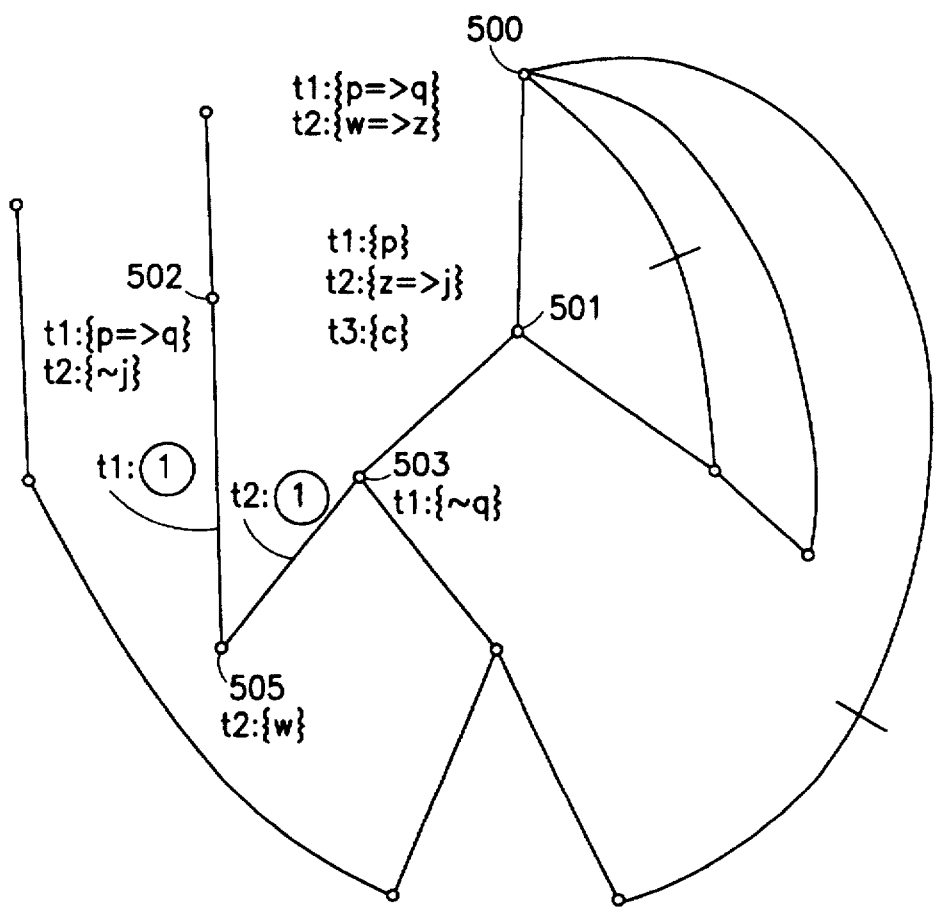
FIG. 25 is a network diagram depicting how different link preferences for different rule types can change the sets of rules that apply to nodes.

FIG. 25 shows how different link preferences for different rule types affect the computation of the rule set that applies to a node. The focus is on node 505. The same example, with a uniform link preference of the link between nodes 505 to 503 over the links between nodes 505 and 502 has already been computed in FIG. 21: the rules that apply to node 505 are:

t1: $\{p,\neg q\}$ t2: $\{w, z==>j, w==>z\}$ t3: $\{c\}$

However, because of the different link preferences here, the rules that apply to node 505 are:

t1: $\{p==>q,\neg q\}$ t2: $\{w, z==>j, w==>z\}$ t3: $\{c\}$

The difference is in the rules of type t1, since now the link between nodes 505 and 502 is preferred for rules of type t1.

FIG. 26 shows how this newest form of inheritance hierarchy is stored in the computer's memory. A node is somewhat modified from its former depiction in FIG. 22. It has a node number (2602), m children (2630, 2640) and 1 sets of rules, corresponding to 1 different types. There are k1 rules of type 1 in the node (2650,2660), and so on, onto k1 rules of type 1 (2670,2680). However, now each of the n parents (2610,2620) has 1 different orderings (2612, 2614, 2622, 2624) indicating the possibly different link preferences.

Figure 27A:
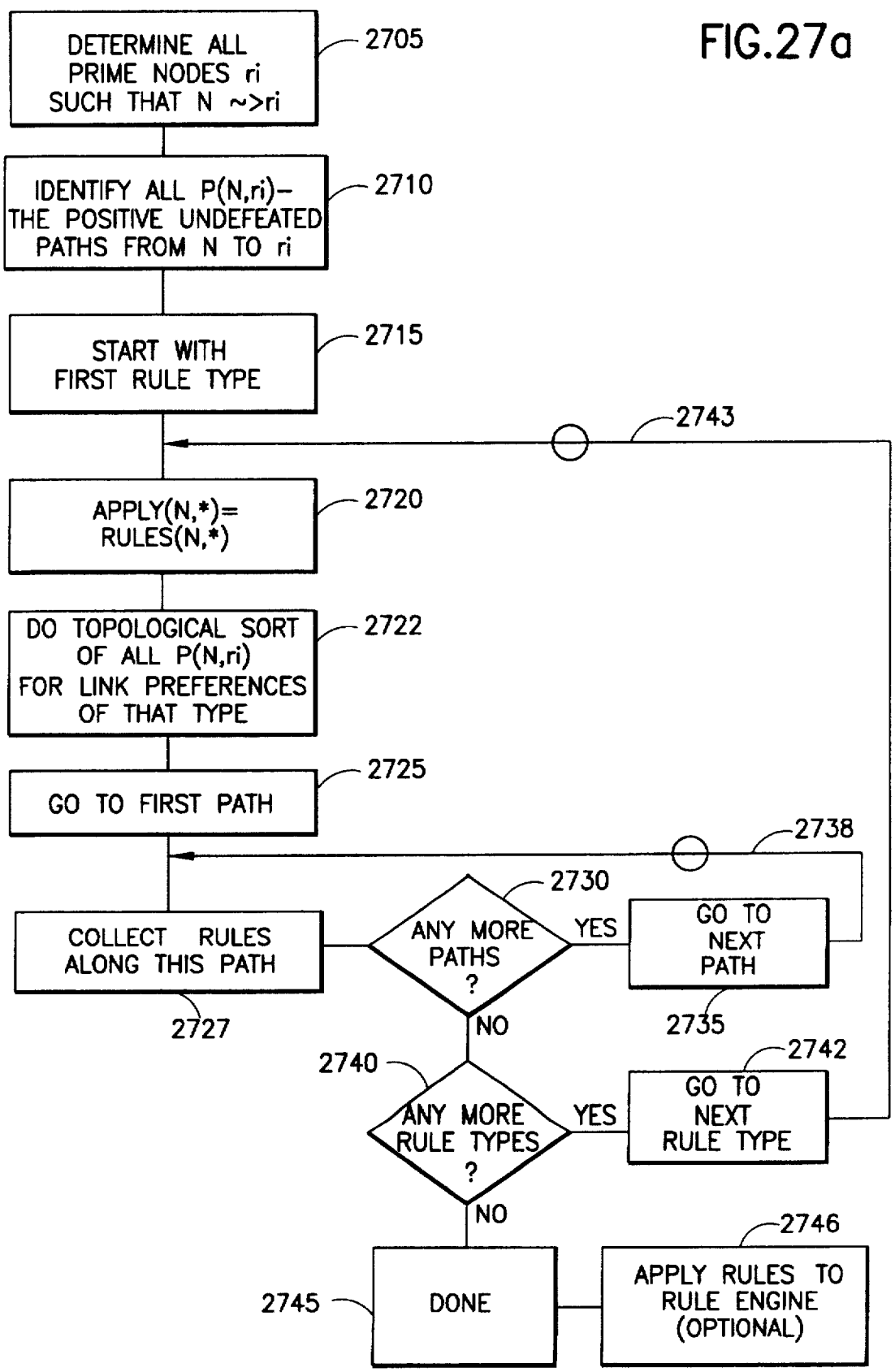
FIG. 27a is a flow chart of the process steps performed to determine the rules that apply to a node, given an inheritance hierarchy with rules categorized by type, and different link preferences given for different rule types.
Figure 27B:
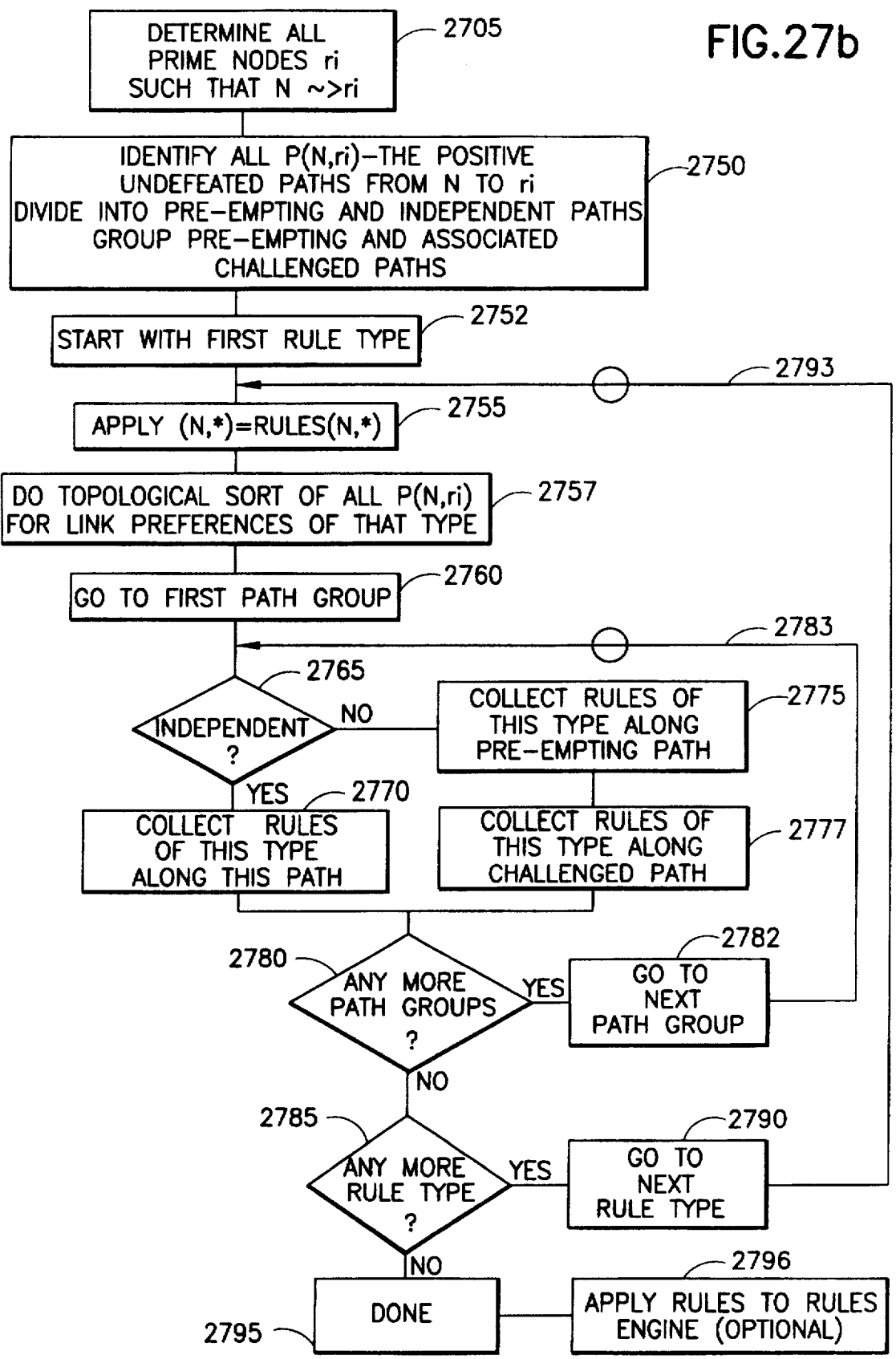
FIG. 27b is a flow chart of the process steps performed to determine the rules that apply to a node, given an inheritance hierarchy with rules categorized by type, and different link preferences given for different rule types, assuming a certain ordering between preempting and associated challenged paths.
Figure 28A:
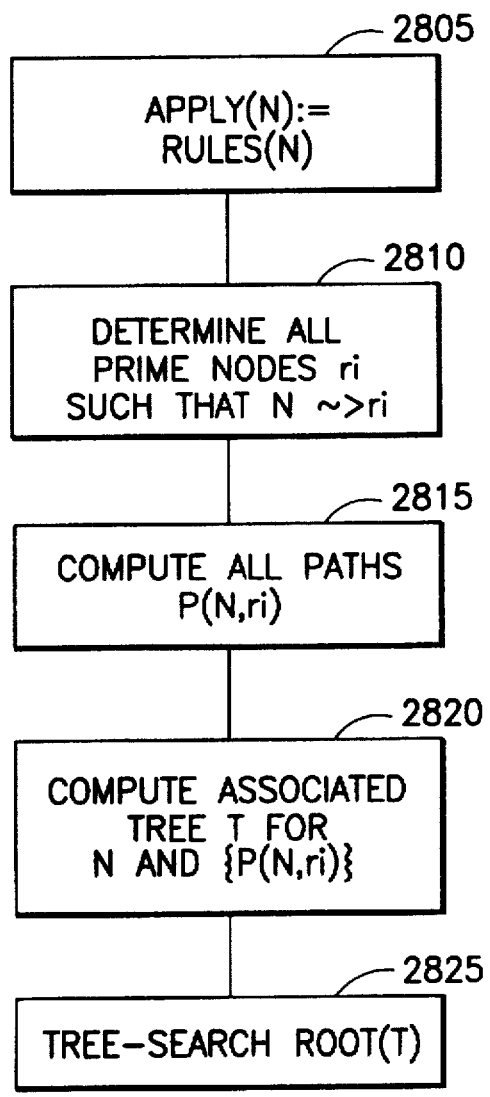
FIG. 28 is a flow chart showing an alternative preferred method of determining the set of rules that apply to the focus node.
Figure 28B:
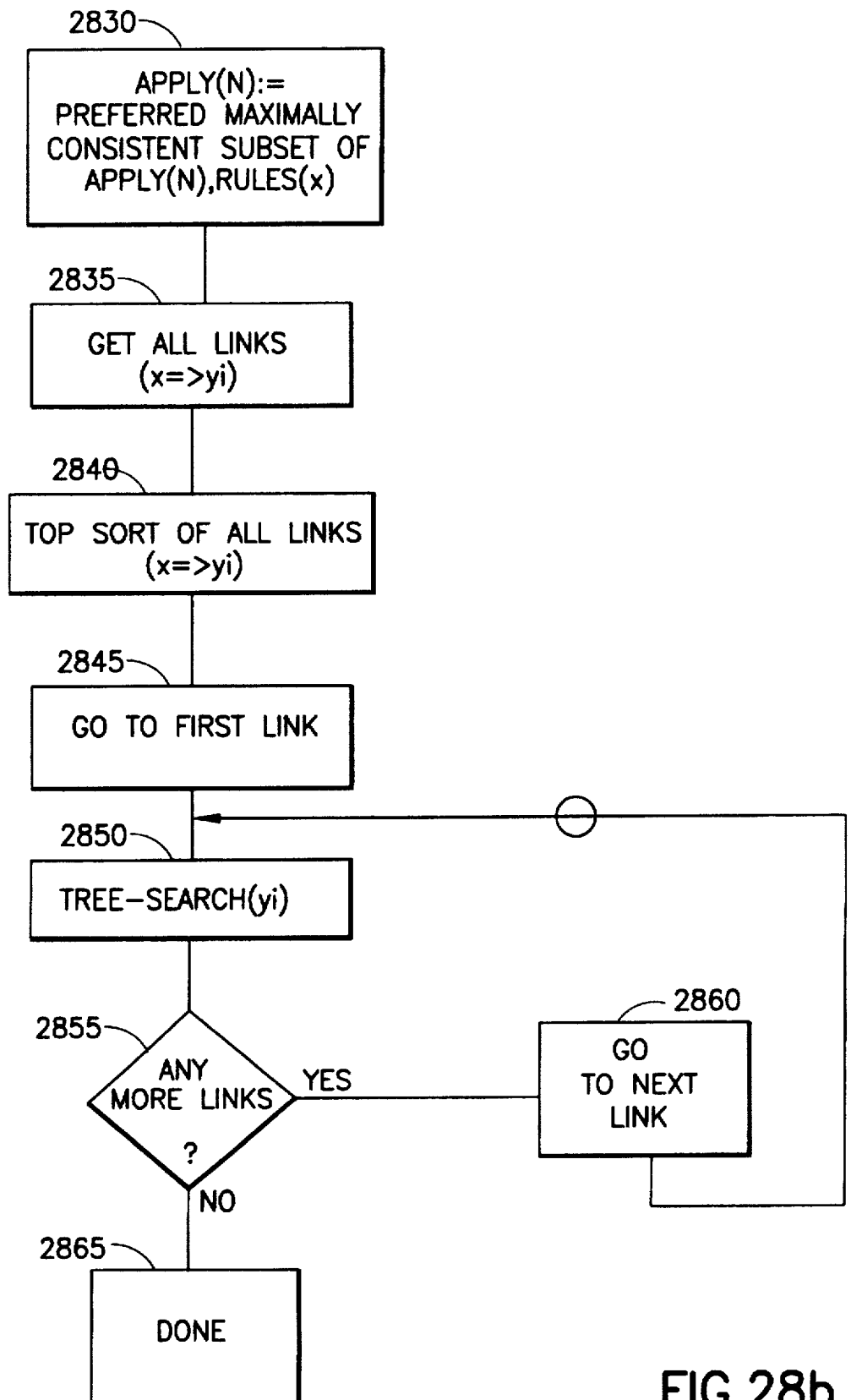

FIGS. 27a and 27b illustrates the process used to determine the rules that apply to a focus node N in this modified hierarchy. FIG. 27b differs from FIG. 27a in that rules attached to nodes on preempting paths always defeat rules attached to nodes on their associated challenged paths. There is a parallel between FIG. 27a and FIG. 17a, on the one hand, and between FIG. 27b and FIG. 17b on the other hand.

The following notation is used: apply(N,*) is the collected set of rules that apply to the focus node N for the current rule type. rules(N,*) are the rules of the current type that apply to the focus node N.

FIG. 27a begins by determining all prime nodes ri such that there is a positive undefeated path between the focus nodeN and ri (2705). One then identifies all these paths P(N,ri) (2710). One then proceeds to the first rule type (2715). One sets the collected rule set for rules of this type, apply(N,*) to the rules of this type that are attached to N (2720). One does a topological sort of all paths determined in step 2710 for link preferences of this type (2722).

One then proceeds to go to the first path (2725) and collects rules along this path (2727) (FIG. 18 describes this step in more detail). One then checks to see if there are any more paths (2730). If there are more paths, one goes on to the next path (2735), and loops around to collect rules on this path (2727). If there are no more paths, one checks to see if there are any more rule types to be collected (2740). If there are more rule types, one goes on to the next rule type (2742), and loops around to process rules of this type (2720). If there are no more rule types, the process is completed (2745). Again, there is an optional step of using the rules that have been collected as input to a rules engine (2746).

The process described in FIG. 27b is similar. It differs in that preempting paths are always traversed before their associated challenged paths to ensure that rules along preempting paths have priorities. Thus, the second step in this process (2750) identifies all positive undefeated paths between the focus node N and the prime nodes ri, as in step (2710) in FIG. 27a, but also divides these paths into independent and preempting paths, and groups preempting paths with associated challenged paths. As in FIG. 27a, one starts with the first rule type (2752), and initializes the collected rule set for that type with the rules of that type attached to N (2755). One does a topological sort for that type of path groups (2757), and goes through all path groups, checking for each group to see whether that path group is independent (2765). If independent, rules are collected along that path (2770); if not, rules are collected first along preempting (2775) and then along challenged paths (2777). One checks to see if there are more path groups (2780), proceeding to the next group (2782) if there are more path groups, otherwise checking to see if there are more rule types (2785). If there are more rule types, one proceeds to the next rule type (2790); otherwise, the process is completed (2795).

Given this disclosure alternative equivalent embodiments will become apparent to those skilled in the art. These embodiments are also within the contemplation of the inventors.

I claim:

1. A computer system with one or more memories and one or more central processing units comprising:
   a. a data structure, stored in one or more of the memories, representing a semantic network with three or more nodes connected by two or more links, each of the nodes representing an object, the semantic network describing the way the objects relate to one another, each of the nodes being one of a root node, internal node, and leaf node, the internal nodes and leaf nodes having one or more parent fields pointing to one or more other nodes in the network being parent nodes, the root and internal nodes having one or more child fields pointing to one or more other nodes in the network being child nodes, one or more ancestor nodes being either a parent node or recursively an ancestor of one of the parent nodes, a set of one or more rules attached to one or more of the nodes, a rule being a statement that at least partially regulates the object represented by the respective node and all the rules in the set being consistent;
   b. a background data structure, stored in one or more of the memories containing one or more information items, each of the information items being attached to every node in the semantic network and at least partially regulating the objects represented by all the nodes in the semantic network; and
   c. a process that proceeds node by node up one or more paths of the links to each ancestor node in the path, creating an interim set of rules by iteratively adding rules attached to each of the ancestors nodes processed only if the added rules are consistent with the rules in the interim set and the background information items, after all the ancestors of the node are processed the interim set being a superset of rules that are all the rules in the semantic network that regulate the node, the superset being a maximally consistent subset of all the rules attached to all of the ancestor nodes.

2. A computer system, as in claim 1, where the parent fields are ordered in a partial order, the partial order arranging the parent fields by dividing a set of parent fields into a sequence of subsets of parent fields, each parent field in any subset being of higher value than any parent field in any succeeding subset but all parent fields in any one of the subsets being of equal value to one another.

3. A computer system, as in claim 2, where the parent fields are ordered in a total order and where the total order is the partial order in which each subset of parent fields has exactly one element.

4. A computer system, as in claim 1, where one or more of the maximally consistent subsets is selected as a preferred maximally consistent subset based on a preference criterion.

5. A computer system, as in claim 4, where the preference criterion is specificity in the semantic network, where specificity is understood as specificity in the semantic network, that is, a first node is more specific than a second node if the first node is a descendant of the second node.

6. A computer system, as in claim 2, where one or more of the maximally consistent subsets is selected as a preferred maximally consistent subset based on a preference criterion.

7. A computer system, as in claim 6, where the preference criterion is a partial order of the parent nodes.

8. A computer system, as in claim 1, where one or more of the links between nodes is a cancel link and the ancestor node connected to the node by the cancel link is not processed by step c.

9. A computer system, as in claim 8, where the parent fields are in a partial order, the partial order arranging the parent fields by dividing a set of parent fields into a sequence of subsets of parent fields, each parent field in any subset being of higher value than any parent field in any succeeding subset but all parent fields in any one of the subsets being of equal value to one another.

10. A computer system with one or more memories and one or more central processing units comprising:
   a. a data structure, stored in one or more of the memories, representing a semantic network with three or more nodes connected by two or more links, each of the nodes representing an object, the semantic network describing the way the objects relate to one another, each of the nodes being one of a root node, internal node, and leaf node, the internal nodes and leaf nodes having one or more parent fields pointing to one or more other nodes in the network being parent nodes, the root and internal nodes having one or more child fields pointing to one or more other nodes in the network being child nodes, one or more ancestor nodes being either a parent node or recursively an ancestor of one of the parent nodes, a set of one or more rules attached to one or more of the nodes, a rule being a statement that at least partially regulates the object represented by the respective node and all the rules in the set being consistent, the rules being divided into one or more rule categories, the rules in each category being statements partially regulating the objects represented by the respective node and all the rules in the category and in the set being consistent;
   b. a background data structure, stored in one or more of the memories containing one or more information items, each of the information items being attached to every node in the semantic network; and c. a process that transforms the set of rules attached for each category to one or more of the nodes to a superset of rules for each category by proceeding up one or more paths of the links in an order, the paths connecting the node with all the ancestors of the node on each of the paths, the process iteratively adding rules attached for each of the categories to each of the ancestors to form an interim set for each category only if the added rules are consistent with the rules in the interim set for each category and the background information items, the superset of rules for each category being the rules in the interim set for the category after all the ancestors of the node are processed, the superset of rules for each category being all the rules for that category in the semantic network that regulate the node, the superset being a maximally consistent subset of all the rules for that category attached to all of the ancestor nodes.

11. A computer system, as in claim 10, where one or more of the maximally consistent subsets is selected as a preferred maximally consistent subset based on a preference criterion.

12. A computer system, as in claim 10, where one or more of the links between nodes are cancel links and the ancestor node connected to the node by the cancel link is not processed in step c.

13. A computer system, as in claim 10, where the parent fields are ordered in a partial order for each category.

14. A computer system, as in claim 10, where the parent fields are ordered in a total order for each category.

15. A computer system with one or more memories and one or more central processing units comprising:

a. a data structure, stored in one or more of the memories, representing a semantic network with three or more nodes connected by two or more links, each of the nodes representing an object, the semantic network describing the way the objects relate to one another, each of the nodes being one of a root node, internal node, and leaf node, the internal nodes and leaf nodes having one or more parent fields pointing to one or more other nodes in the network being parent nodes, the root and internal nodes having one or more child fields pointing to one or more other nodes in the network being child nodes, one or more ancestor nodes being either a parent node or recursively an ancestor of one of the parent nodes, a set of one or more rules attached to one or more of the nodes, a rule being a statement that at least partially regulates the object represented by the respective node and all the rules in the set being consistent;

b. a background data structure, stored in one or more of the memories containing one or more information items, each of the information items being attached to every node in the semantic network and at least partially regulating the objects represented by all the nodes in the semantic network; and c. a process that proceeds node by node up one or more paths of the links in an order to each ancestor node in the path, creating an interim set of rules by iteratively adding rules attached to each of the ancestors nodes processed only if the added rules are consistent with the rules in the interim set and the background information items, after all the ancestors of the node are processed the interim set being a superset of rules that are all the rules in the semantic network that regulate the node, the superset being a maximally consistent subset of all the rules attached to all of the ancestor nodes.

16. A method of selecting a set of rules that apply to a focus node of a semantic network of nodes having multiple inheritance, the focus node representing a class of physical objects, comprising the steps of:

a. setting a collected rule set of one or more rules equal to a set of rules attached to a focus node in the semantic network of three or more nodes;

b. determining all of the one or more ancestral nodes in the semantic network that are most distant from the focus node and that have a positive undefeated path between the focus node and the respective ancestral nodes, the ancestral nodes being prime nodes;

c. identifying all of the positive undefeated paths between the focus node and the prime nodes;

d. topologically sorting the positive undefeated paths to determine an order;

e. in the order determined by the topological sort, traversing each of the positive undefeated paths by visiting each of one or more nodes on the positive undefeated path in an upward direction from the focus node to the respective prime node, and at each of the nodes visited, being a visited node, taking the preferred maximally consistent subset of the collected rule set and the rules attached to the visited node to create a new collected rule set; and f. after traversing all of the positive undefeated paths, taking the new collected rule set as a final set of rules that apply to the focus node.

17. A method, as in claim 16, where each of the nodes are marked once the node is visited and there is no preferred maximally consistent subset determined at the marked nodes.

18. A method, as in claim 17, where the positive undefeated paths are grouped into independent groups of one independent positive undefeated path per independent group and preempting groups that contain one preempting path and one or more challenged paths that are preempted by their associated preempting path and where a preempting path is a unique member of a set of two or more paths from one node to a second node, such that all paths in the set not equal to the preempting path are preempted by the preempting path.

19. A method, as in claim 17, where the topological sorting is done for each of one or more rule types, there is a separate order for each of the rule types, and the marking during traversal is done for each of the orders.

20. A system, as in claim 1, where the object includes any one or more of the following: a thing and an activity.

21. A system, as in claim 20, where the thing includes any one or more of the following: a drug, a medication, a class of drugs, a price, one or more symptoms, a person, a business application, a brand, an animal, real-world application, a cost, a product, and a life threatening condition.

22. A system, as in claim 20, where the activity includes any one or more of the following: a therapy, a service, a professional service, a medical service, a doctor's visit, a family planning service, a preventive care service, a prescription service, and a diagnostic procedure.

23. A system, as in claim 1, where the information items includes any one or more of the following: a set of background facts, a list of drugs, a set of background rules, an eligibility criteria, a description of personnel, and a table of pricing.

24. A system, as in claim 1, where the rules that regulate the objects include any one or more of the following: a regulation about dispensing a drug, a logical formula, a criteria for payment, a method of payment, a criteria for qualification, a criteria for receipt of services, a criteria for discharge, one or more business rules, a cost sharing criteria, an access criteria, an administrative regulation, and a medical regulation.

25. A system, as in claim 9, where one or more of the maximally consistent subsets is selected as a preferred maximally consistent subset based on a preference criterion.

26. A system, as in claim 8, where one or more of the maximally consistent subsets is selected as a preferred maximally consistent subset based on a preference criterion.

27. A system, as in claim 26, where the preference criterion is specificity in the semantic network.

28. A system, as in claim 27, where the preference criteria further includes selecting a preempting path over an associated challenged path.

29. A system, as in claim 12, where one or more of the maximally consistent subsets is selected as a preferred maximally consistent subset based on a preference criterion.

30. A system, as in claim 29, where the preference criterion is specificity in the semantic network.

31. A system, as in claim 12, where the parent fields are ordered in a partial order, where a partial order is a method of arranging elements in a set by dividing the set into a sequence of subsets, each member of any subset being of higher value than any member of a directly succeeding subset, but all members of a particular subset being of equal value to one another.

32. A system, as in claim 31, where one or more of the maximally consistent subsets is selected as a preferred maximally consistent subset based on a preference criterion.

33. A system, as in claim 32, where the preference criterion is specificity in the semantic network.

34. A system, as in claim 33, where the preference criteria further includes an order of the parent nodes.

35. A system, as in claim 34, where the preference criteria further includes selecting a preempting path over an associated challenged path, where a preempting path is a unique member of a set of two or more paths from a first node to a second node, such that all paths in the set not equal to the preempting path are preempted by the preempting path.

36. A computer system, as in claim 13, where the preference criterion is specificity in the semantic network.

37. A computer system, as in claim 36, where the preference criteria further includes an order of the parent nodes.

* * * * *